US012707483B2

(12) United States Patent
Shin et al.

(10) Patent No.: US 12,707,483 B2
(45) Date of Patent: Aug. 11, 2026

(54) METHOD AND DEVICE FOR SUPPORTING DISCONTINUOUS RECEPTION OF SIDELINK IN WIRELESS COMMUNICATION SYSTEM

(71) Applicant: Samsung Electronics Co., Ltd., Suwon-si (KR)

(72) Inventors: Cheolkyu Shin, Suwon-si (KR); Hyunseok Ryu, Suwon-si (KR); Sungjin Park, Suwon-si (KR); Heedon Gha, Suwon-si (KR); Youngbum Kim, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 18/284,705

(22) PCT Filed: Apr. 1, 2022

(86) PCT No.: PCT/KR2022/004748

§ 371 (c)(1),
(2) Date: Sep. 28, 2023

(87) PCT Pub. No.: WO2022/211593

PCT Pub. Date: Oct. 6, 2022

(65) Prior Publication Data

US 2024/0163907 A1 May 16, 2024

(30) Foreign Application Priority Data

Apr. 1, 2021 (KR) ........................ 10-2021-0042936

(51) Int. Cl.
*H04W 72/40* (2023.01)
*H04W 72/02* (2009.01)
(Continued)

(52) U.S. Cl.
CPC ........... *H04W 72/40* (2023.01); *H04W 72/02* (2013.01); *H04W 72/25* (2023.01); *H04W 76/28* (2018.02)

(58) Field of Classification Search
CPC ..... H04W 72/40; H04W 76/28; H04W 72/25; H04W 72/02
See application file for complete search history.

(56) References Cited

U.S. PATENT DOCUMENTS

2020/0359375 A1* 11/2020 Hwang ................. H04L 5/0055
2023/0276359 A1 8/2023 Xu et al.
(Continued)

FOREIGN PATENT DOCUMENTS

CN 112512102 A 3/2021
WO 2020/153749 A1 7/2020
WO 2020/218892 A1 10/2020

OTHER PUBLICATIONS

NTT Docomo, Inc., Discussion on sidelink resource allocation for power saving, R1-2101630, 3GPP TSG RAN WG1 #104, e-Meeting, Jan. 19, 2021.
(Continued)

*Primary Examiner* — Won Tae C Kim
(74) *Attorney, Agent, or Firm* — Jefferson IP Law, LLP

(57) ABSTRACT

The disclosure relates to a fifth generation (5G) or sixth generation (6G) communication system for supporting higher data rates. According to an embodiment of the disclosure, an operation method of a first user equipment (UE) for performing sidelink communication in a wireless communication system includes: obtaining discontinuous reception (DRX) configuration information; obtaining physical sidelink feedback channel (PSFCH) resource configuration information; transmitting a physical sidelink shared channel (PSSCH) to a second UE; transmitting, to the second UE, sidelink control information (SCI) including
(Continued)

information requesting to transmit a PSFCH for the PSSCH; and receiving the PSFCH for the PSSCH from the second UE during a DRX active time when there is a slot for receiving the PSFCH in the DRX active time.

14 Claims, 26 Drawing Sheets

(51) Int. Cl.
*H04W 72/25* (2023.01)
*H04W 76/28* (2018.01)

(56) References Cited

U.S. PATENT DOCUMENTS

| | | | | |
|---|---|---|---|---|
| 2024/0049341 | A1* | 2/2024 | Agiwal | H04W 72/25 |
| 2024/0057125 | A1* | 2/2024 | Park | H04L 1/1812 |

OTHER PUBLICATIONS

Huawei, Physical layer impacts of sidelink DRX, R1-2101254, 3GPP TSG RAN WG1 Meeting #104-e, E-meeting, Jan. 19, 2021.
LG Electronics, Discussion on resource allocation for power saving, R1-2100517, 3GPP TSG RAN WG1 Meeting #104-e, e-Meeting, Jan. 19, 2021.
Extended European Search Report dated Aug. 29, 2024, issued in European Application No. 22781712.9-1215.
Huawei et al., R2-2009413, Consideration on the sidelink DRX for unicast, groupcast and broadcast, 3GPP TSG RAN WG2 #112-E, Nov. 2, 2020.
LG (rapporteur), R2-2101727, Summary of email discussion [702][SLe] High-level principles for SL DRX (LG), 3GPP TSG RAN WG2 #113-E, Jan. 2021.
3GPP, TS38.213 v16.4.0, 3rd Generation Partnership Project; Technical Specification Group Radio Access Network; NR; Physical layer procedures for control (Release 16), Dec. 2020.
Korean Office Action dated Mar. 25, 2026, issued in a Korean Patent Application No. 10-2021-0042936.

* cited by examiner (a) In-coverage SCENARIO (b) Partial coverage SCENARIO (c) Out-of-coverage SCENARIO (d) Intel-cell V2X Communication SCENARIO (a) Unicast V2X COMMUNICATION (b) Groupcast V2X COMMUNICATION

METHOD AND DEVICE FOR SUPPORTING DISCONTINUOUS RECEPTION OF SIDELINK IN WIRELESS COMMUNICATION SYSTEM

TECHNICAL FIELD

The disclosure relates to a wireless communication system, and more particularly, to a method and apparatus for supporting sidelink discontinuous reception.

BACKGROUND ART

Fifth generation (5G) mobile communication technologies define wide frequency bands to allow for high transmission rates and new services, and may also be implemented not only in a sub-6 Gigahertz (GHz) band, e.g., 3.5 GHz, but also in an ultrahigh frequency band (above 6 GHz) referred to as millimeter waves (mmWave) such as 28 GHz and 39 GHz. Moreover, for sixth generation (6G) mobile communication technologies referred to as a beyond 5G system, it is considered to be implemented in Terahertz (THz) bands (e.g., bands from 95 GHz to 3 THz) to attain transmission rates 50 times higher than an ultra-low delay reduced to one-tenth of the 5G mobile communication technology.

In an early stage of the 5G mobile communication technology, beamforming and massive multiple input multiple output (MIMO) to mitigate a radio path loss and increase the radio propagation distance in the ultra-high frequency band, support for various numerologies (operation of multiple subcarrier spacing) and dynamic slot format operation for efficient use of ultra-high frequency resources, initial access technologies for supporting multiple-beam transmission and widebands, definition and operation of bandwidth parts (BWPs), new channel coding schemes such as polar codes for highly reliable transmission of control information and low density parity check (LDPC) codes for high-volume data transmission, L2 preprocessing, network slicing for providing a dedicated network specialized for a particular service, etc., were standardized to support services and satisfy performance requirements for enhanced mobile broadband (eMBB), ultra-reliable low-latency communications (URLLC), and massive machine-type communications (mMTC).

Improvement and performance enhancement of the early 5G mobile communication technology are currently being discussed with consideration for the services that the 5G mobile communication technology has intended to support, and physical layer standardization for technologies such as vehicle-to-everything (V2X) to help driving decisions of autonomous vehicles and increase user convenience based on locations and status information of the vehicles transmitted by the vehicles, new radio unlicensed (NR-U) to aim at system operations conforming to various regulatory requirements in an unlicensed band, an NR terminal low-power consumption technology (UE power saving), non-terrestrial network (NTN), which is a direct terminal-satellite communication for securing coverage in a region where communication with a terrestrial network is unavailable, positioning, etc., is ongoing.

In addition, standardization of wireless interface architecture/protocol areas for technologies such as industrial Internet of things (IIoT) for supporting new services through connection and convergence with other industries, integrated access and backhaul (IAB) that provides a node to integrally support the wireless backhaul link and the access link to extend the network service area, mobility enhancement including conditional handover and dual active protocol stack (DAPS) handover, 2-step random access channel (RACH) for new radio (NR) to simplify the random access procedure, etc., and standardization of system architectures/service areas such as 5G baseline architectures (e.g., service based architectures or service based interfaces) for combination of network functions virtualization (NFV) and software-defined networking (SDN), mobile edge computing (MEC) to receive services based on a location of the terminal, etc., is also underway.

When such 5G mobile communication systems are commercialized, explosively increasing connected devices may be connected to the communication network, so that it is expected that enhancement of functions and performance of the 5G mobile communication system and integrated operation of the connected devices are required. For this, new research will be on the way for 5G performance enhancement and complexity reduction, artificial intelligence (AI) service support, metaverse service support, drone communication, etc., using AI, machine learning (ML) and extended reality (XR) to efficiently support augmented reality (AR), virtual reality (VR), mixed reality (MR), etc.

Advancement of the 5G mobile communication system may also be fundamental to developing not only a multiple antenna transmission technology such as large-scale antennas, array antennas, full dimensional multi-input multi-output (FD-MIMO) and new waveforms for guaranteeing coverage in THz bands of the 6G mobile communication technology, a high-dimensional spatial multiplexing technology using orbital angular momentum (OAM) and metamaterial based lens and antennas to enhance coverage of THz band signals, and a reconfigurable intelligent surface (RIS) technology, but also a full-duplex technology for frequency efficiency improvement and system network enhancement of the 6G mobile communication technology, an AI based communication technology to materialize system optimization by using a satellite and AI from a design stage and internalizing an end-to-end AI support function, a next generation distributed computing technology to materialize sophisticated services beyond the limit of terminal computation capacity by using ultra-high performance communication and computing resources, etc.

With the development of the aforementioned wireless communication systems, it is possible to provide various services, and there is a need for a method to provide the services seamlessly.

DISCLOSURE

Technical Problem

Embodiments of the disclosure relate to a wireless communication system, and are directed to a method and apparatus for selecting transmission resources through cooperation between user equipments (UEs) in a procedure in which a vehicle UE that supports vehicle-to-everything (V2X) uses sidelink to exchange information with a UE of another vehicle and a UE of a pedestrian. More particularly, embodiments of the disclosure may provide UE operations for handling reception of a physical sidelink feedback channel (PSFCH) during discontinuous reception (DRX) between UEs.

Technical Solution

According to an embodiment of the disclosure, an operation method of a first user equipment (UE) for performing sidelink communication in a wireless communication system includes: obtaining discontinuous reception (DRX) configuration information; obtaining physical sidelink feedback channel (PSFCH) resource configuration information; transmitting a physical sidelink shared channel (PSSCH) to a second UE; transmitting, to the second UE, sidelink control information (SCI) including information requesting to transmit a PSFCH for the PSSCH; and receiving the PSFCH for the PSSCH from the second UE during a DRX active time when there is a slot for receiving the PSFCH in the DRX active time.

Advantageous Effects

An embodiment of the disclosure is to provide a procedure for selecting a resource and sensing while discontinuous reception (DRX) between user equipments (UEs) is performed in sidelink communication. According to an embodiment of the disclosure, power consumption of a UE may be minimized effectively. Furthermore, according to an embodiment of the disclosure, reception of a physical sidelink feedback channel (PSFCH) may be handled while the UE is operating in DRX.

BEST MODE

Figure 1:
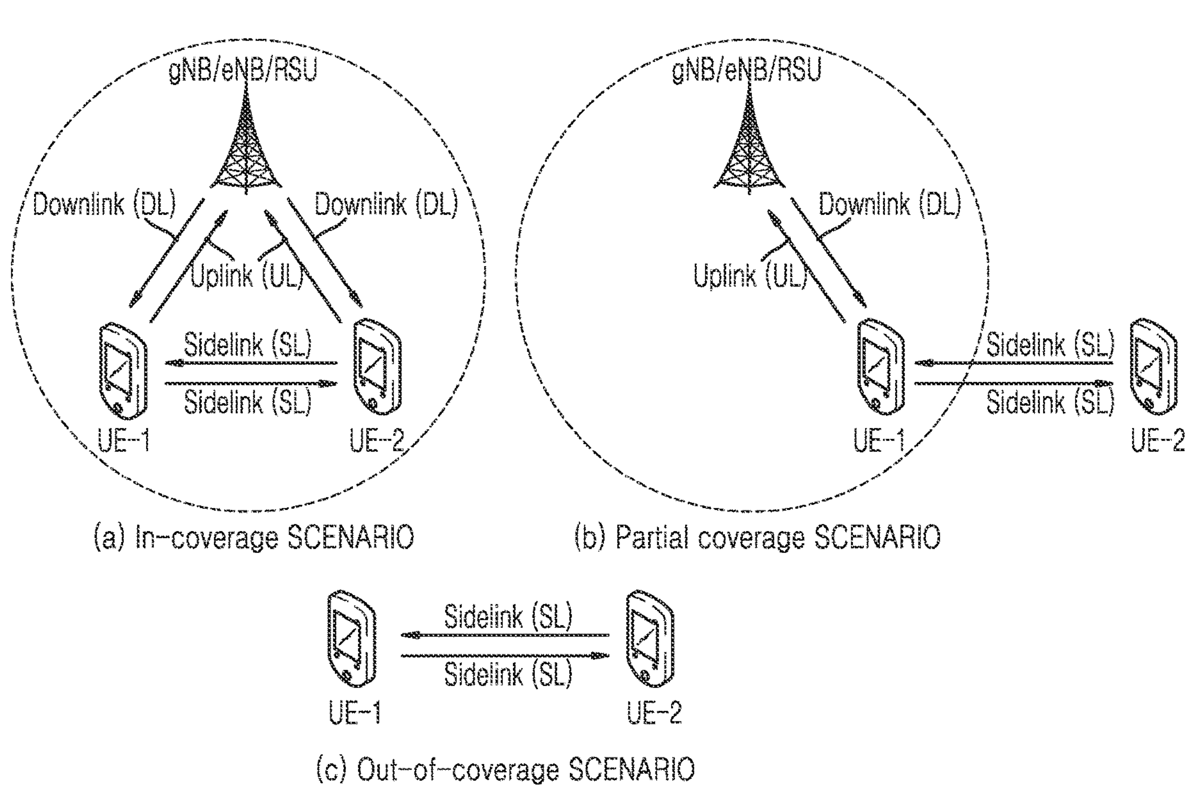
FIG. 1 illustrates a system, according to an embodiment of the disclosure.
Figure 1:
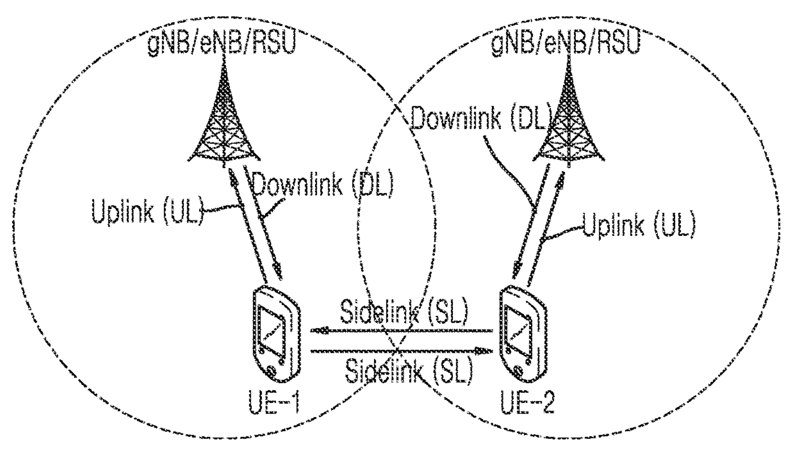

According to an embodiment of the disclosure, a first user equipment (UE) for performing sidelink communication in a wireless communication system includes a transceiver and at least one processor, wherein the at least one processor is configured to obtain discontinuous reception (DRX) configuration information, obtain physical sidelink feedback channel (PSFCH) resource configuration information, transmit a physical sidelink shared channel (PSSCH) to a second UE, transmit, to the second UE, sidelink control information (SCI) including information requesting to transmit a PSFCH for the PSSCH, receive the PSFCH for the PSSCH from the second UE during a DRX active time when there is a slot for receiving the PSFCH in the DRX active time.

In an embodiment of the disclosure, the slot for receiving the PSFCH may be defined always as the DRX active time.

In an embodiment of the disclosure, the at least one processor may be configured to transmit, to the second UE, SCI including information requesting not to transmit the PSFCH for the PSSCH when the PSFCH is in a DRX inactive time.

In an embodiment of the disclosure, the at least one processor may be configured to receive, from the second UE, the PSFCH for the PSSCH in a slot for receiving the PSFCH present in a DRX inactive time, when the slot for receiving the PSFCH for the PSSCH is in the DRX inactive time, and receive no information other than the PSFCH in the slot for receiving the PSFCH present in the DRX inactive time.

In an embodiment of the disclosure, a resource for the PSSCH may be selected so that reception of the PSFCH corresponding to the PSSCH is in the DRX active time.

In an embodiment of the disclosure, the at least one processor may be configured to determine candidate resources of PSSCHs each having a corresponding PSFCH in the DRX active time among a plurality of PSSCHs, and transmit the PSSCH among candidate resources of the PSSCHs.

In an embodiment of the disclosure, the at least one processor may be configured to receive the PSFCH for the PSSCH in a first PSFCH slot belonging to the DRX active time among slots after a minimum time gap between the PSSCH and the PSFCH from a slot for the PSSCH, when a slot for receiving the PSFCH is in the DRX inactive time.

In an embodiment of the disclosure, the at least one processor may be configured to obtain, through higher layer signaling, information about how to handle a PSFCH when DRX is performed, and determine to receive or not receive the PSFCH, based on the obtained information about how to handle a PSFCH when the DRX is performed.

According to an embodiment of the disclosure, a second UE for performing sidelink communication in a wireless communication system includes: a transceiver; and at least one processor, wherein the at least one processor is configured to receive, from a first UE, SCI including information requesting to transmit a PSSCH and a PSFCH for the PSSCH, and transmit the PSFCH for the PSSCH to the first UE when there is a slot for the PSFCH in a DRX active time of the first UE based on the SCI.

In an embodiment of the disclosure, the slot for the PSFCH may be defined always as the DRX active time.

In an embodiment of the disclosure, the at least one processor may be configured to receive, from the first UE, SCI including information requesting not to transmit the PSFCH for the PSSCH when the PSFCH is in the DRX inactive time of the first UE.

In an embodiment of the disclosure, the at least one processor may be configured to transmit, to the first UE, the PSFCH for the PSSCH in a slot for the PSFCH in the DRX inactive time, when the slot for the PSFCH for the PSSCH is in the DRX inactive time of the first UE, and transmit no information other than the PSFCH in the slot for the PSFCH in the DRX inactive time.

In an embodiment of the disclosure, the at least one processor may be configured to transmit the PSFCH for the PSSCH in a first PSFCH slot belonging to the DRX active time of the first UE among slots after a minimum time gap between the PSSCH and the PSFCH from a slot for the PSSCH, when there is a slot for the PSFCH in the DRX inactive time of the first UE.

MODE FOR INVENTION

Embodiments of the disclosure will be described in detail with reference to accompanying drawings.

Technological content well-known in the art or not directly related to the disclosure is omitted in the following description. Through the omission of the content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like or corresponding numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

Furthermore, each block may represent a part of a module, segment, or code including one or more executable instructions to perform particular logic function(s). It is noted that the functions described in the blocks may occur out of order in some alternative embodiments. For example, two blocks shown in succession may in fact be executed substantially concurrently or the blocks may sometimes be executed in the reverse order, depending upon the functionality involved.

Furthermore, the term 'unit' or 'module' as herein used refers to a software or hardware component, such as field programmable gate array (FPGA) or application specific integrated circuit (ASIC) which plays a certain role. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

Although embodiments of the disclosure will be primarily focused on a radio access network, New RAN (NR), and a core network, packet core (fifth generation (5G) system, 5G core network, or next generation (NG) core) in a 5G mobile communication standard specified by the third generation partnership project (3GPP), the subject matter of the disclosure may also be applicable to other communication systems with a similar technical background with minor changes without significantly departing from the scope of the disclosure, which may be feasible under the determination of those of ordinary skill in the art to which the disclosure pertains.

In the 5G system, to support network automation, a network data collection and analysis function (NWDAF), which is a network function to provide a function that analyzes and provides data collected in the 5G network, may be defined. The NWDAF may collect/store/analyze information from the 5G network and provide the result to an unspecified network function (NF), and the result of analysis may be used by each NF independently.

For convenience of explanation, some of the terms and names defined by the 3GPP standard (a standard for 5G, NR, LTE or similar system) will be used hereinafter. The disclosure is not, however, limited to the terms and definitions, and may equally apply to any systems that conform to other standards.

Herein, terms to identify access nodes, terms to refer to network entities, terms to refer to messages, terms to refer to interfaces among network entities, terms to refer to various types of identification information, etc., are examples for convenience of explanation. Accordingly, the disclosure is not limited to the terms as herein used, and may use different terms to refer to the items having the same meaning in a technological sense.

To meet the ever-increasing demand with respect to wireless data traffic since the commercialization of the fourth generation (4G) communication system, there have been efforts to develop an advanced 5G communication system (NR). The 5G communication system has been designed even to allow resources of ultra-frequency (mm-Wave: millimeter wave) bands, e.g., 28 GHz frequency band, to attain higher data rates. To reduce propagation loss of radio waves and increase a transmission range of radio waves in the ultrahigh frequency bands, beamforming, massive multiple-input multiple-output (MIMO), full dimensional MIMO (FD-MIMO), array antenna, analog beamforming, and large-scale antenna techniques are under discussion. Furthermore, in the 5G communication system, supported is various subcarrier spacing such as 30 kHz, 60 kHz, 120 kHz, etc., including 15 kHz unlike the LTE, and the physical control channel uses polar coding, and the physical data channel uses low density parity check (LDPC). Moreover, not only discrete Fourier transform-spread-orthogonal frequency division multiplexing (DFT-S-OFDM) but also cyclic prefix-orthogonal frequency division multiplexing (CP-OFDM) are used for waveforms for UL transmission. While LTE supports hybrid automatic repeat request (HARQ) in transport blocks, 5G may additionally support HARQ retransmission based on a code block group (CBG) into which several code blocks (CBs) are grouped.

To improve system networks, technologies for evolved small cells, advanced small cells, cloud radio access networks (RANs), ultra-dense networks, device to device (D2D) communication, wireless backhaul, vehicle to everything (V2X) networks, cooperative communication, coordinated multi-points (CoMP), reception interference cancellation and the like are also being developed for the 5G communication system.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, are combined with an IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart homes, smart buildings, smart cities, smart cars or connected cars, smart grids, health care, smart home appliances and advanced medical services through convergence and combination between existing information technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud radio access network (cloud RAN) as the aforementioned big data processing technology may be an example of convergence of 5G and IoT technologies. In the communication system, a plurality of services may be provided for a user, and to provide such a plurality of services for the user, a method of providing the respective services to fit their characteristics in a same time interval and a corresponding apparatus are required. Various services provided in the 5G communication system are being studied, and one of them is a service that satisfies requirements for low latency and high reliability. In a case of V2X communication in particular, an NR V2X system supports UE-to-UE unicast communication, groupcast (or multicast) communication and broadcast communication. Furthermore, NR V2X is aiming to provide more advanced services such as platooning, advanced driving, extended sensor, and remote driving, unlike LTE V2X aiming at transmission or reception of basic safety information required for driving of a vehicle on the road.

In an embodiment of the disclosure, a method and apparatus for performing discontinuous reception (DRX) in a procedure in which a vehicle UE that supports V2X uses sidelink to transmit or receive information to or from a UE of another vehicle and a UE carried by a pedestrian may be provided.

When a slot in which to transmit a physical sidelink shared channel (PSSCH) transmission resource in sidelink is determined, a slot in which to transmit a physical sidelink feedback channel (PSFCH) may be determined based on PSFCH configuration information of a resource pool. Furthermore, DRX between UEs may be considered for sidelink communication. When DRX is applied, battery efficiency may be increased by minimizing power consumption of the UE. When the sidelink DRX is independent from the PSFCH reception, i.e., the PSFCH reception is possible regardless of the DRX configuration, the problem to be solved by an embodiment of the disclosure may not arise. However, when the PSFCH reception is possible regardless of the DRX configuration, this may not be desirable in terms of power consumption of the UE. Hence, an embodiment of the disclosure provides a UE operation in which a resource for a PSFCH is configured in the resource pool, a UE in the resource pool is able to receive the PSFCH, and the UE handles (receives or not receive) the PSFCH when the UE performs sidelink DRX. Specifically, a UE operation for a transmission UE to handle HARQ acknowledgment (ACK) reception when a PSFCH resource is configured in a sidelink DRX inactive time section may be defined. For this, the following methods may be considered.

method 1: In this case, the transmission UE disables sidelink HARQ feedback through indication of sidelink control information (SCI) to prevent a reception UE from transmitting the PSFCH.

method 2: A drx-PSFCH-Timer is defined for the sidelink DRX, operating from a slot in which the physical sidelink control channel (PSCCH)/PSSCH is transmitted, and the transmission UE may receive the PSFCH in a slot corresponding to when the drx-PSFCH-Timer expires. (The slot is defined to be a DRX active time (in which control information reception is allowed), or alternatively, the transmission terminal is able to receive only PSFCH but unable to receive control information (first and second SCI) in the slot).

method 3: The transmission UE may not receive the PSFCH in the sidelink DRX inactive time. Accordingly, when the PSFCH is in the DRX active time section, the transmission UE is able to receive the PSFCH. Otherwise, the transmission UE disables sidelink HARQ feedback through SCI indication to prevent the reception UE from transmitting the PSFCH.

method 4: The transmission UE may not receive the PSFCH in the sidelink DRX inactive time. Accordingly, when the PSFCH is in the DRX inactive time section, a PSSCH resource selected in mode 2 may be reselected.

method 5: The transmission UE may not receive the PSFCH in the sidelink DRX inactive time. Accordingly, to have PSSCH resource candidates in mode 2, the PSSCH resource candidates are limited to ones that are able to receive the PSFCH.

method 6: The transmission UE may not receive the PSFCH in the sidelink DRX inactive time. Accordingly, a position of the PSFCH resource is defined to be the first PSFCH resource belonging to a DRX active time section after a minimum time gap between the PSSCH and the PSFCH.

An embodiment of the disclosure describes an occasion when the PSFCH reception operation may be limited in a case that sidelink DRX is performed and provides methods and UE operations for the occasion. An embodiment of the disclosure is proposed to support the aforementioned scenario, and especially, aims at providing a method and apparatus for performing sidelink DRX.

FIG. 1 illustrates a system, according to an embodiment of the disclosure.

Referring to FIG. 1, (a) of FIG. 1 illustrates an occasion when all V2X UEs (UE-1 and UE-2) are located in coverage of a base station (BS) (in-coverage: IC). All the V2X UEs may receive data and control information from the BS in downlink (DL) or transmit data and control information to the BS in uplink (UL). In this case, the data and control information may be data and control information for V2X communication. The data and control information may be data and control information for general cellular communication. Furthermore, the V2X UEs may transmit or receive the data and control information for V2X communication in sidelink or SL.

Referring to FIG. 1, (b) of FIG. 1 illustrates an occasion when UE-1 among the V2X UEs is located in the coverage of the BS and UE-2 is located out of the coverage of the BS. In other words, (b) of FIG. 1 illustrates partial coverage (PC) where a certain V2X UE (UE-2) is located out of the coverage of the BS. The V2X UE (UE-1) located in the coverage of the BS may receive data and control information from the BS in DL or transmit data and control information to the BS in UL. The V2X UE (UE-2) located out of the coverage of the BS may not receive data and control information from the BS in DL and may not transmit data and control information to the BS in UL. The V2X UE (UE-2) may transmit or receive data and control information for V2X communication to or from the V2X UE (UE-1) in sidelink.

Referring to FIG. 1, (c) of FIG. 1 illustrates an occasion when all the V2X UEs are located out of the coverage (OOC) of the BS. Hence, the V2X UEs (UE-1 and UE-2) may not receive data and control information from the BS in DL and may not transmit data and control information to the BS in UL. The V2X UEs (UE-1 and UE-2) may transmit or receive data and control information for V2X communication in sidelink.

Referring to FIG. 1, (d) of FIG. 1 illustrates a scenario of performing V2X communication between V2X UEs (UE-1 and UE-2) located in different cells. Specifically, (d) of FIG. 1 shows an occasion when the V2X UEs (UE-1 and UE-2) are connected to different BSs (a radio resource control (RRC) connected state) or camped on the different BSs (RRC disconnected state, i.e., RRC idle state). In this case, the V2X UE (UE-1) may be a V2X transmitting UE, and the V2X UE (UE-2) may be a V2X receiving UE. Alternatively, the V2X UE (UE-1) may be a V2X receiving UE, and the V2X UE (UE-2) may be a V2X transmitting UE. The V2X UE (UE-1) may receive a system information block (SIB) from a BS it accesses (or on which it is camped), and the V2X UE (UE-2) may receive an SIB from another BS it accesses (or on which it is camped). In this case, for the SIB, the existing SIB or an SIB separately defined for V2X may be used. Furthermore, information of the SIB received by the V2X UE (UE-1) and information of the SIB received by the V2X UE (UE-2) may be different from each other. Hence, to perform V2X communication between UEs (UE-1 and UE-2) located in different cells, information needs to be unified or a method by which related information is signaled to interpret the SIB information transmitted from each different cell.

Although a V2X system including V2X UEs (UE-1 and UE-2) is shown in FIG. 1 for convenience of explanation, it is not limited thereto but communication may be performed between more V2X UEs. (UL and DL) interfaces between the BS and the V2X UEs may be referred to as Uu interfaces, and sidelink between V2X UEs may be referred to as a PC5 interface. They may be interchangeably used in embodiments of the disclosure. In the meantime, in an embodiment of the disclosure, the UE may include a vehicle that supports vehicle-to-vehicle (V2V) communication, a vehicle or a handset (e.g., a smartphone) of a pedestrian that supports vehicle-to-pedestrian (V2P) communication, a vehicle that supports vehicle-to-network (V2N) communication, or a vehicle that supports vehicle-to-infrastructure (V2I) communication between a vehicle and a transportation infrastructure. Furthermore, in an embodiment of the disclosure, the UE may include a road side unit (RSU) equipped with a UE function, an RSU equipped with a BS function, or an RSU equipped with part of the BS function and part of the UE function.

In an embodiment of the disclosure, a BS may be a BS that supports both V2X communication and common cellular communication, or a BS that supports only V2X communication. In this case, the BS may be a 5G BS (gNB), 4G BS (eNB) or an RSU. Hence, in an embodiment of the disclosure, the BS may be also referred to as the RSU.

Figure 2:
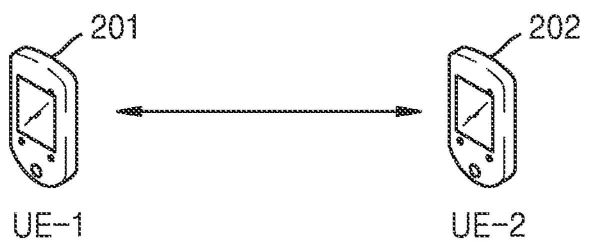
FIG. 2 illustrates a vehicle-to-everything (V2X) communication method performed through sidelink, according to an embodiment of the disclosure.
Figure 2:
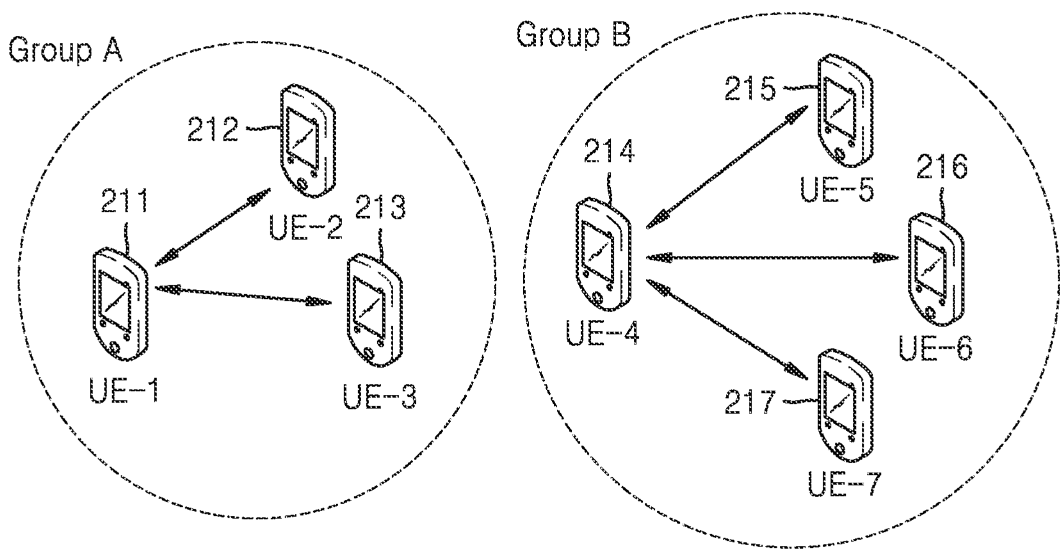

FIG. 2 illustrates a V2X communication method performed through sidelink, according to an embodiment of the disclosure.

Referring to (a) of FIG. 2, UE-1 201, e.g., transmitting (TX) UE, and UE-2 202, e.g., receiving (RX) UE, may perform one-to-one communication, which may be termed unicast communication.

Referring to (b) of FIG. 2, the TX UE and the RX UE may perform one-to-many communication, which may be termed groupcast or multicast. In (b) of FIG. 2, UE-1 211, UE-2 212 and UE-3 213 may form one group, Group A, to perform groupcast communication, and UE-4 214, UE-5 215, UE-6 216 and UE-7 217 may form another group, Group B, to perform groupcast communication. Each UE may perform groupcast communication only within the group it belongs to, and communication between different groups may be performed by unicast, groupcast or broadcast communication. In (b) of FIG. 2, shown are two groups, Group A and Group B formed, without being limited thereto.

Although not shown in FIG. 2, the V2X UEs may perform broadcast communication. The broadcast communication refers to a case that all V2X UEs receive data and control information transmitted by a V2X TX UE in sidelink. For example, when UE-1 211 is assumed to be a TX UE for broadcasting in (b) of FIG. 2, all the UEs, UE-2 212, UE-3 213, UE-4 214, UE-5 215, UE-6 216 and UE-7 217, may receive data and control information transmitted by UE-1 211.

In NR V2X, unlike LTE V2X, supporting a form in which a vehicle UE sends data to a specified node through unicast and a form in which the vehicle UE sends data to many specified nodes through groupcast may be considered. For example, in a service scenario such as platooning, which is a technology of connecting two or more vehicles to a network and moving them in a grouped form, the unicast and groupcast technologies may be usefully used. Specifically, for a leader node in a group connected by platooning, unicast communication may be required to control a particular node, and groupcast communication may be required to control a group comprised of many particular nodes simultaneously.

Figure 3:
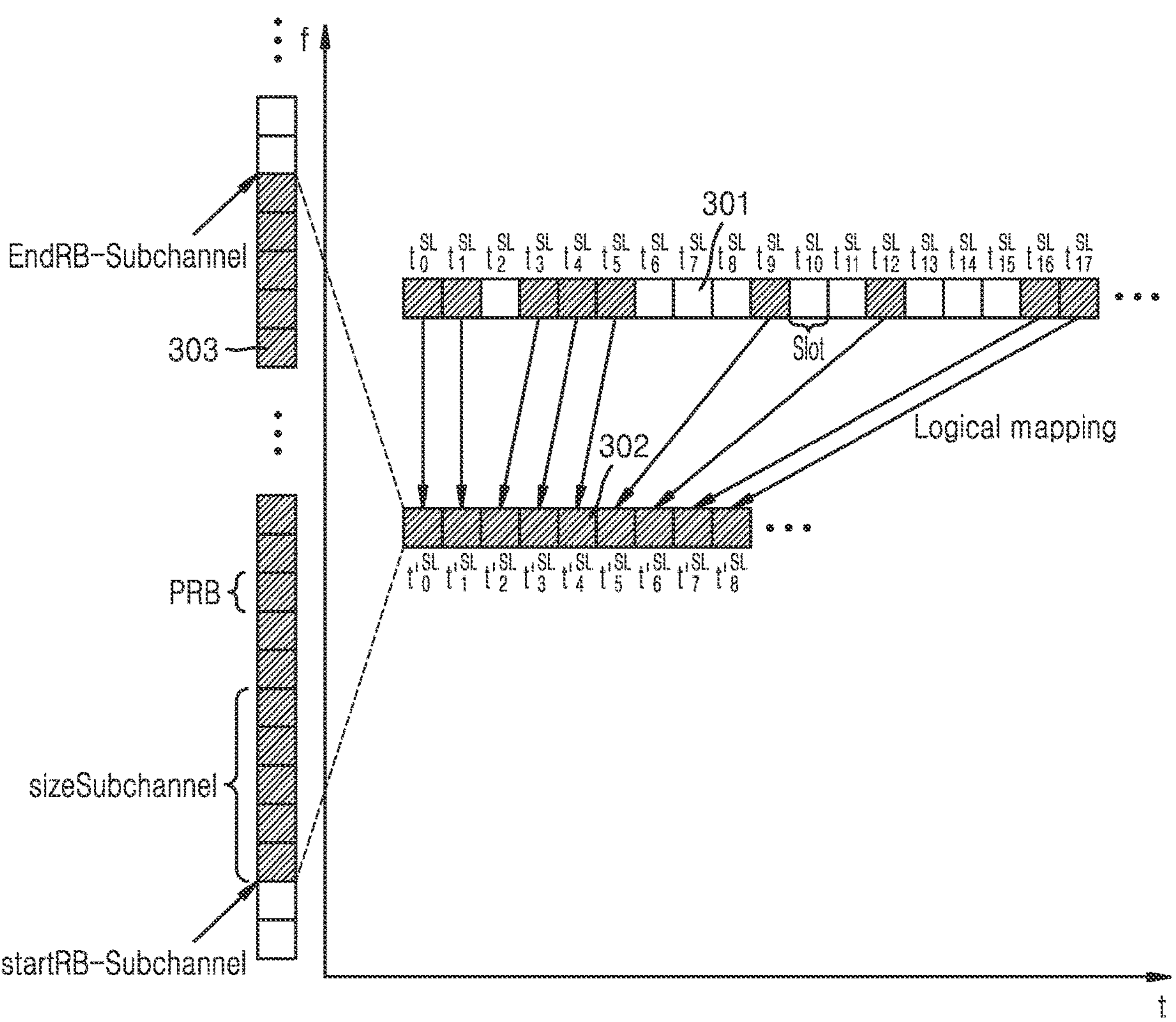
FIG. 3 is a diagram for describing a resource pool defined as a set of resources in time and frequencies used for sidelink transmission and reception, according to an embodiment of the disclosure.

FIG. 3 is a diagram for describing a resource pool defined as a set of resources in time and frequencies used for sidelink transmission and reception, according to an embodiment of the disclosure.

Referring to FIG. 3, resource granularity on the time axis in the resource pool may be a slot. Resource granularity on the frequency axis may be a subchannel comprised of one or more physical resource blocks (PRBs). Although discontinuous allocation of the resource pool in time is described as an example in an embodiment of the disclosure, the resource pool may be continuously allocated in time. Furthermore, although continuous allocation of the resource pool in frequencies is described as an example in an embodiment of the disclosure, discontinuous allocation of the resource pool in frequencies is not excluded.

Referring to FIG. 3, shown is an occasion 301 when a resource pool is discontinuously allocated in time. Referring to FIG. 3, a case that granularity of the resource allocation in time is a slot is shown. First, sidelink slots may be defined within slots used for UL. Specifically, the length of symbols used for sidelink in one slot may be configured in BWP information. Hence, among the slots used for UL, slots that do not guarantee the symbol length set for sidelink may not be sidelink slots. Furthermore, the slots except for those in which a sidelink synchronization signal block (S-SSB) is transmitted may be determined into the resource pool that enables sidelink transmission and reception. Referring to 301, shown is a set of slots $$(t_0^{SL}, t_1^{SL}, t_2^{SL}, \ldots)$$

to be used for sidelink in time except for the aforementioned slots. In 301, shaded portions represent sidelink slots belonging to the resource pool. The sidelink slots belonging to the resource pool may be (pre-)configured in resource pool information through a bitmap. Referring to 302, shown is a set of sidelink slots $$(t'^{SL}_0, t'^{SL}_1, t'^{SL}_2, \ldots)$$

belonging to the resource pool in time. In an embodiment of the disclosure, the (pre-)configuration may mean that the configuration information is pre-configured and stored in advance in the UE or configured for the UE by the BS in a cell-common method. The cell-common method may refer to the UEs in the cell receiving a configuration of the same information from the BS. In this case, a method by which the UE obtains cell-common information by receiving sidelink system information block (SL-SIB) from the BS may be considered. It may also refer to the UE being configured in a UE-specific method after having RRC connection set up with the BS. The term UE-specific may be replaced by UE-dedicated, and may refer to each UE receiving configuration information of a specific value. In this case, a method by which the UE obtains UE-specific information by receiving an RRC message from the BS may be considered. For the (pre-)configuration, a method of configuration with resource pool information and a method of configuration without resource pool information may be considered. In the case of configuration with resource pool information, UEs operating in the resource pool may all operate based on common-configuration information except that the UE is configured UE-specifically after establishing RRC connection with the BS. On the other hand, the method of configuration without the resource pool information for the (pre-)configuration may be a method basically configured independently from the resource pool configuration information. For example, one or more modes (for example, A, B and C) may be (pre-)configured in the resource pool, and the information (pre-)configured independently from the resource pool configuration information may indicate which one (for example, A, B or C) of the modes (pre-)configured in the resource pool is to be used.

Referring to 303 in FIG. 3, shown is continuous allocation of the resource pool in frequencies. Resource allocation on the frequency axis may be configured with sidelink BWP information, which may be performed in the unit of subchannel. The subchannel may be defined as a resource allocation unit in frequencies, which is comprised of one or more physical resource blocks (PRBs). In other words, the subchannel may be defined to be an integer multiple of the PRB. Referring to 303, the subchannel may include 5 successive PRBs, and the size of the subchannel, sizeSubchannel, may be equal to a size of the 5 successive PRBs. However, what is shown in the drawing is merely an example of the disclosure, and the size of the subchannel may be set differently, and it is common but not necessary for one subchannel to have successive PRBs. The subchannel may be a basic unit for resource allocation for a PSSCH. In 303, startRB-Subchannel may indicate a start position of the subchannel on the frequency in the resource pool. In a case that a resource is allocated on the frequency in the unit of subchannel, the resource may be allocated on the frequency through configuration information about an index of a resource block (RB) where the subchannel starts, startRB-Subchannel, information about how many PRBs forms the subchannel, sizeSubchannel, a total number of subchannels, numSubchannel, etc. In this case, the information about startRB-Subchannel, sizeSubchannel, and numSubchannel may be (pre-)configured in information about the resource pool on the frequency.

Figure 4:
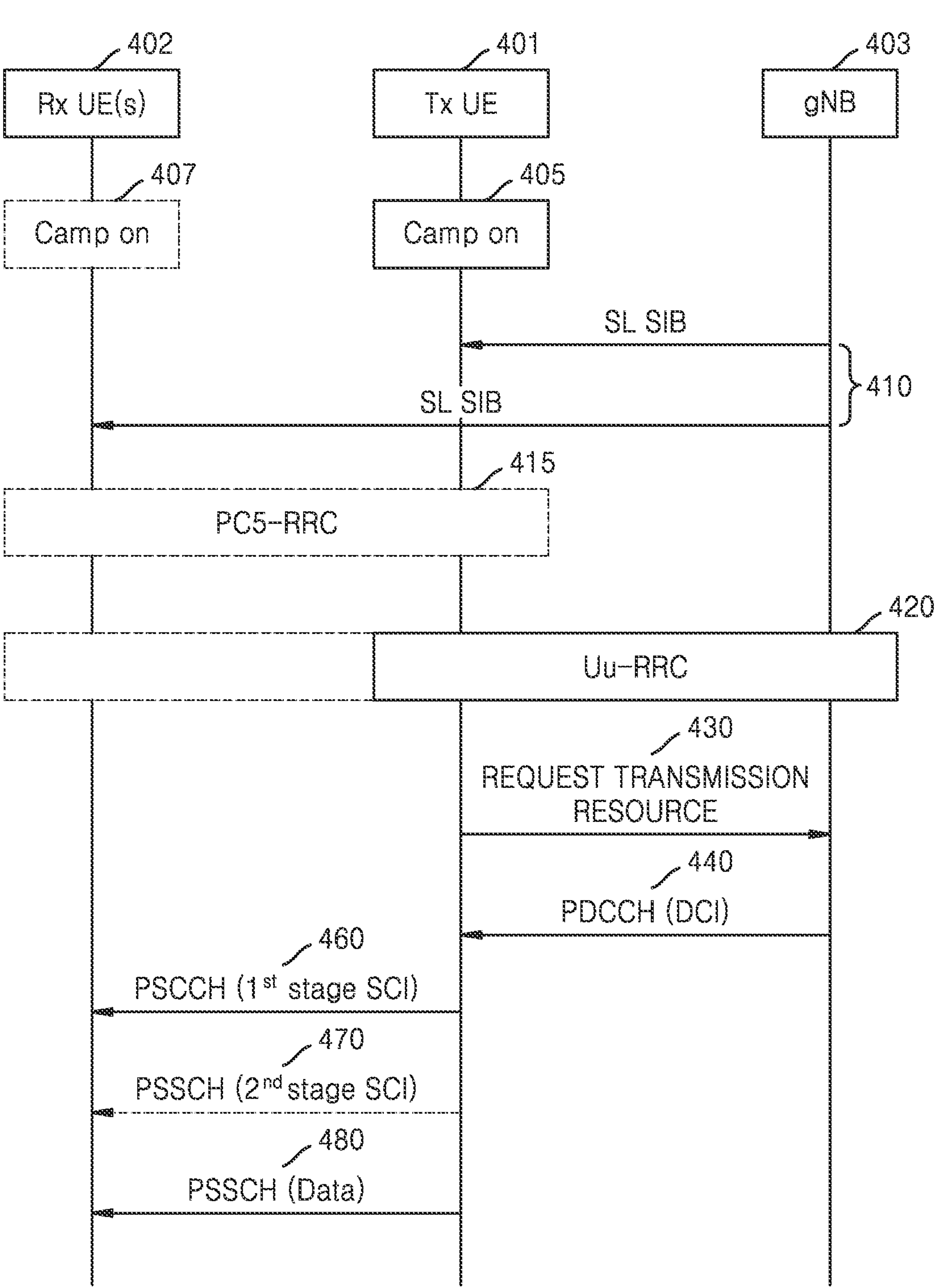
FIG. 4 is a sequence chart illustrating how a base station (BS) allocates transmission resources in sidelink, according to an embodiment of the disclosure.

FIG. 4 is a sequence chart illustrating how a BS (or gNB) allocates transmission resources in sidelink, according to an embodiment of the disclosure.

How the BS allocates a transmission resource in sidelink will now be referred to as Mode 1. Mode 1 may correspond to scheduled resource allocation. In an embodiment, Mode 1 may indicate a method by which the BS allocates a resource to be used for sidelink transmission to RRC connected UEs in a dedicated scheduling scheme. The method of Mode 1 may be effective in interference management and resource pool management because the BS is able to manage sidelink resources.

Referring to FIG. 4, in operation 405, a TX UE 401 may camp on a BS or gNB (cell) 403. In an embodiment, camp-on may refer to a state in which, for example, a UE in an idle state (RRC_IDLE) selects (or reselects) a BS (cell) as required to receive system information, paging information or the like.

When an RX UE 402 is located in the coverage of the BS (cell) 403, the RX UE 402 may camp on the BS (cell) 403 in operation 407. On the other hand, when the RX UE 402 is located out of the coverage of the BS (cell) 403, the RX UE 402 may not camp on the BS (cell) 403.

In an embodiment of the disclosure, the RX UE 402 refers to a UE that receives data transmitted by the TX UE 401.

In operation 410, the TX UE 401 and the RX UE 402 may receive sidelink system information blocks (SL-SIBs) from the BS 403. In an embodiment, the SL-SIB information may include sidelink resource pool information for sidelink transmission and reception, parameter configuration information for sensing operation, information for setting sidelink synchronization, carrier information for sidelink transmission or reception operating at different frequencies, etc.

When the TX UE 401 generates data traffic for V2X, the TX UE 401 may be RRC-connected to the BS 403 in operation 420. The RRC connection between the UE and the BS may be referred to as Uu-RRC. Alternatively, the Uu-RRC connection procedure in operation 420 may be performed before the TX UE 401 generates the data traffic. Furthermore, in Mode 1, after the Uu-RRC connection procedure is performed between the BS 403 and the RX UE 402 in operation 420, the TX UE may perform sidelink transmission to the RX UE. Alternatively, in Mode 1, even in a state of the Uu-RRC connection procedure not being performed between the BS 403 and the RX UE 402 in operation 420, the TX UE may perform sidelink transmission to the RX UE.

In operation 430, the TX UE 401 may request a transmission resource for V2X communication with the RX UE 402 from the BS. In this case, the TX UE 401 may request the sidelink transmission resource from the BS 403 by using a physical uplink control channel (PUCCH), an RRC message or a medium access control (MAC) control element (CE). The MAC CE may be e.g., a buffer status report (BSR) MAC CE in a new format (including at least an indicator indicating a BSR for V2X communication and information about a size of data buffered for device-to-device (D2D) communication). Furthermore, the TX UE 401 may request a sidelink resource through a scheduling request (SR) bit transmitted in a PUCCH.

Subsequently, the BS 403 may allocate a V2X transmission resource for the TX UE 401. In this case, the BS may allocate the transmission resource in a dynamic grant or configured grant scheme.

In an embodiment, in the case of the dynamic grant scheme, the BS may allocate a resource for TB transmission through downlink control information (DCI). The sidelink scheduling information included in the DCI may include parameters related to initial transmission and retransmission occasion and frequency allocation position information fields. The DCI for the dynamic grant scheme may be cyclic redundancy check (CRC)-scrambled by a sidelink V2X radio network temporary identifier (SL-V-RNTI) to indicate the dynamic grant scheme.

In another embodiment, in the case of the configured grant scheme, the BS may periodically allocate the resource for TB transmission by setting a semi-persistent scheduling (SPS) interval through the Uu-RRC. In this case, the BS may allocate a resource for one TB through DCI. The sidelink scheduling information for one TB included in the DCI may include parameters related to transmission occasion and frequency allocation position information of initial transmission and retransmission resources. In the case of resource allocation in the configured grant scheme, transmission occasion and frequency allocation positions for initial transmission and retransmission for one TB may be determined by the DCI, and resources for the next TB may be repeated at an SPS interval. The DCI for the configured grant scheme may be CRC-scrambled by an SL-SPS-V-RNTI to indicate the configured grant scheme. Furthermore, the configured grant (CG) scheme may be divided into Type1 CG and Type2 CG. In the case of Type2 CG, a resource configured by the configured grant may be activated or deactivated by DCI.

Hence, in Mode 1, the BS 403 may indicate to the TX UE 401 a schedule for sidelink communication with the RX UE 402 by transmitting the DCI on a physical downlink control channel (PDCCH) in operation 440.

Specifically, the DCI used by the BS 403 for the TX UE 401 for sidelink communication may include DCI format 3_0 or DCI format 3_1. DCI format 3_0 may be defined for DCI for scheduling NR sidelink in one cell, and DCI format 3_1 may be defined for DCI for scheduling LTE sidelink in one cell.

In a case of broadcast transmission, the TX UE 401 may perform transmission without RRC configuration 415 for sidelink. On the contrary, for unicast or groupcast transmission, the TX UE 401 may perform RRC connection with another UE one to one. To be distinguished from Uu-RRC, the RRC connection between UEs may be referred to as PC5-RRC 415. For groupcast, PC5-RRC 415 may be individually connected between UEs in the group. Referring to FIG. 4, although connection of the PC5-RRC 415 is shown as an operation subsequent to transmission of SL-SIB 410, it may be performed at any time before transmission of SL-SIB 410 or transmission of SCI.

In operation 460, the TX UE 401 may transmit (first stage) SCI to the RX UE 402 in a PSCCH. Furthermore, in operation 470, the TX UE 401 may transmit (second stage) SCI to the RX UE 402 in a PSSCH. In this case, the first stage SCI may include information relating to resource allocation. The second stage SCI may include the other control information.

In operation 480, the TX UE 401 may transmit data to the RX UE 402 in the PSSCH. The first stage SCI, the second stage SCI and the PSSCH may be transmitted together in the same slot.

Figure 5:
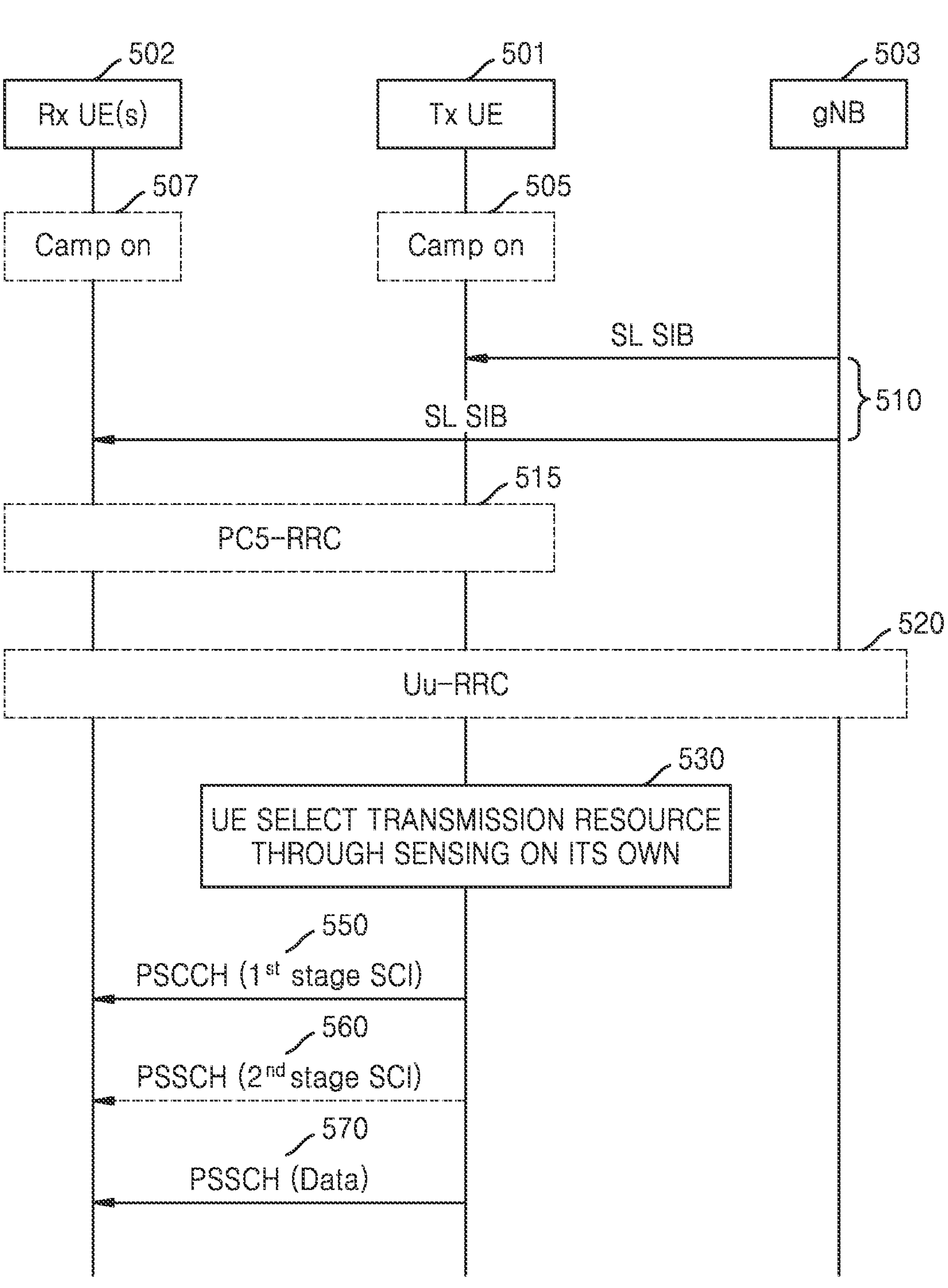
FIG. 5 is a sequence chart illustrating how a user equipment (UE) directly allocates sidelink transmission resources through sensing in sidelink, according to an embodiment of the disclosure.

FIG. 5 is a sequence chart illustrating a method by which a UE directly allocates sidelink transmission resources through sensing in sidelink, according to an embodiment of the disclosure.

How the UE allocates sidelink transmission resources on its own through sensing in sidelink is referred to as Mode 2. Mode 2 may also be referred to as UE autonomous resource selection. In Mode 2, a BS (or gNB) 503 may provide a sidelink transmission and reception resource pool for V2X in system information, and a TX UE 501 may select a transmission resource according to a set rule. Unlike Mode 1 in which the BS is directly involved in resource allocation, what is shown in FIG. 5 has a difference in that the TX UE 501 autonomously selects resources based on a resource pool received through the system information in advance to transmit data.

Referring to FIG. 5, in operation 505, the TX UE 501 may camp on the BS (cell) 503. Camp-on may refer to a state in which, for example, a UE in an idle state (RRC_IDLE) selects (or reselects) a BS (cell) as required to be able to receive system information, paging information or the like. Furthermore, referring to FIG. 5, unlike in the aforementioned FIG. 4, in Mode 2, the TX UE 501 may camp on the BS (cell) 503 when the TX UE 501 is located in the coverage of the BS (cell) 503. On the other hand, when the TX UE 501 is located out of the coverage of the BS (cell) 503, the TX UE 501 may not camp on the BS (cell) 503.

When an RX UE 502 is located in the coverage of the BS (cell) 503, the RX UE 502 may camp on the BS (cell) 503 in operation 507. On the other hand, when the RX UE 502 is located out of the coverage of the BS (cell) 503, the RX UE 502 may not camp on the BS (cell) 503.

In the disclosure, the RX UE 502 refers to a UE that receives data transmitted by the TX UE 501.

In operation 510, the TX UE 501 and the RX UE 502 may receive SL-SIBs from the BS 503. The SL-SIB information may include sidelink resource pool information for sidelink transmission and reception, parameter configuration information for sensing operation, information for setting sidelink synchronization, carrier information for sidelink transmission or reception operating at different frequencies, etc.

A difference between FIGS. 4 and 5 is that the BS 503 and the UE 501 operate in an RRC connected state in FIG. 4 while the UE may operate even in an idle mode 520 (RRC disconnected state) in FIG. 5. Furthermore, even in the RRC connected state 520, the BS 503 may enable the TX UE 501 to autonomously select transmission resources without being directly involved in resource allocation. The RRC connection between the UE 501 and the BS 503 may be referred to as Uu-RRC 520.

In an embodiment, once data traffic for V2X is generated in the TX UE 501, the TX UE 501 may be configured with a resource pool through system information received from the BS 503, and in operation 530, may select time/frequency domain resources from among the configured resource pool on its own through sensing. Once the resources are finally selected, the selected resources may be determined according to a grant for sidelink transmission.

In an embodiment, in a case of broadcast transmission, the TX UE 501 may perform transmission without RRC configuration 515 for sidelink. On the contrary, for unicast or groupcast transmission, the TX UE 501 may perform RRC connection with the other UE one to one. To be distinguished from Uu-RRC, the RRC connection between UEs may be referred to as PC5-RRC 515. For groupcast, PC5-RRC 515 may be individually connected between UEs in the group. Referring to FIG. 5, although connection of the PC5-RRC 515 is shown as an operation subsequent to transmission of SL-SIB 510, it may be performed at any time before transmission of SL-SIB 510 or transmission of SCI.

In operation 550, the TX UE 501 may transmit (first stage) SCI to the RX UE 502 in a PSCCH. Furthermore, in operation 560, the TX UE 401 may transmit (second stage) SCI to the RX UE 402 in a PSSCH. In this case, the first stage SCI may include information relating to resource allocation, and the second stage SCI may include the other control information. In operation 570, the TX UE 501 may transmit data to the RX UE 502 in the PSSCH. The first stage SCI, the second stage SCI and the PSSCH may be transmitted together in the same slot.

In an embodiment, the SCI used by the TX UE 401 or 501 for the RX UE 402 or 502 for sidelink communication is the first stage SCI, which may include SCI format 1-A. It may also be the second stage SCI which may include SCI format 2-A or SCI format 2-B. The SCI format 2-A in the second stage SCI may be used by including information for PSSCH decoding when the use of HARQ feedback is not available or when HARQ feedback is used and includes ACK or NACK information. On the other hand, the SCI format 2-B may include information for PSSCH decoding to be used when HARQ feedback is not used or when HARQ feedback is used but only includes NACK information. For example, the SCI format 2-B may be used to be limited to groupcast transmission.

Figure 6A:
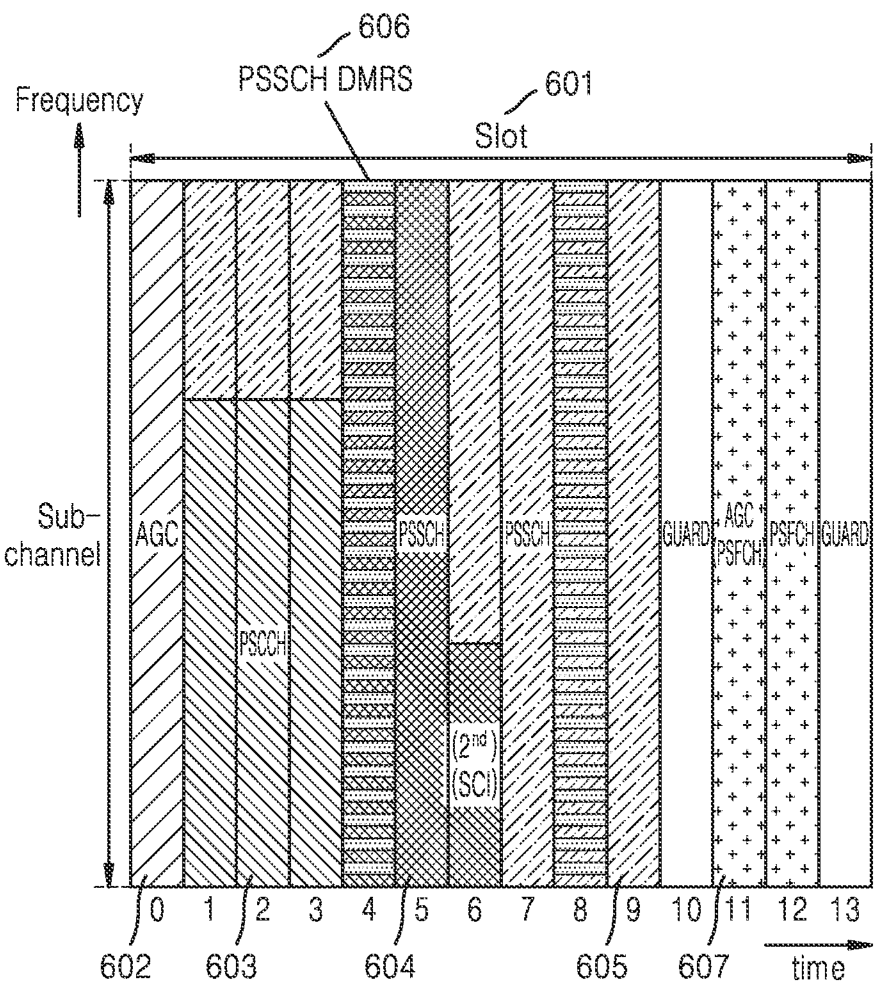
FIG. 6A illustrates a mapping structure of physical channels mapped into a slot for sidelink, according to an embodiment of the disclosure.
Figure 6B:
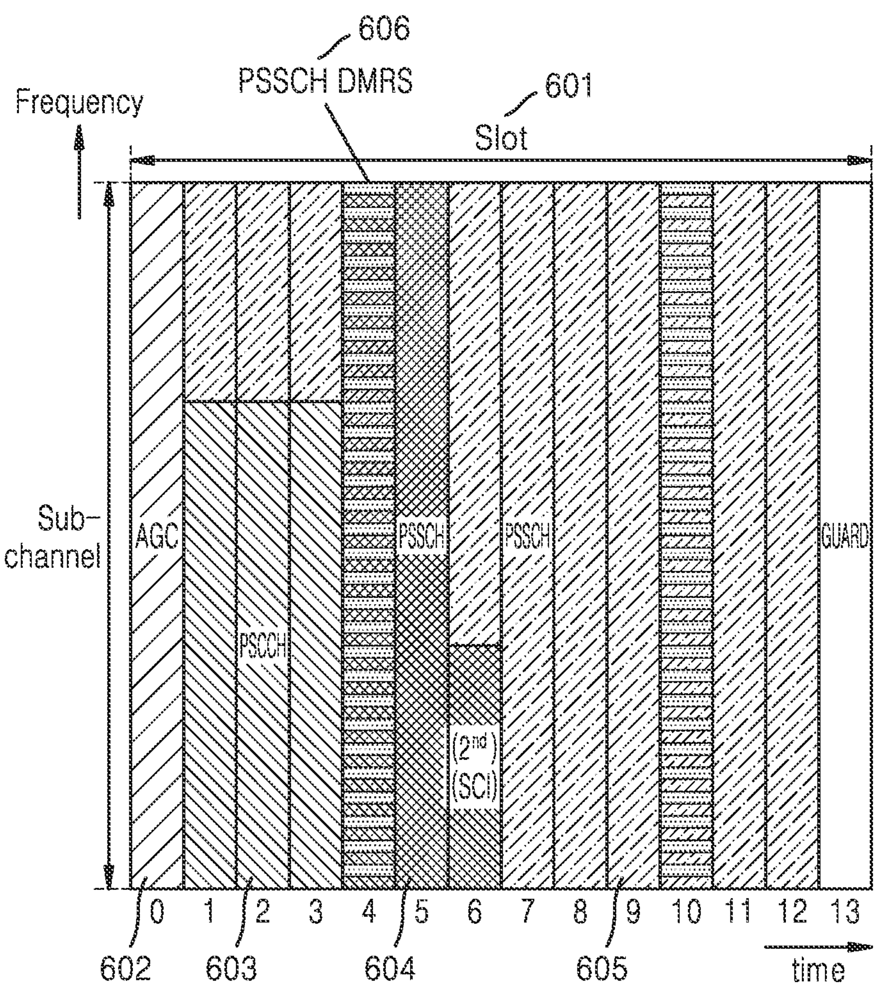
FIG. 6B illustrates a mapping structure of physical channels mapped into a slot for sidelink, according to an embodiment of the disclosure.

FIGS. 6A and 6B illustrate a mapping structure of physical channels mapped to a slot for sidelink, according to an embodiment of the disclosure.

Specifically, mapping of PSCCH/PSSCH/physical sidelink feedback channel (PSFCH) physical channels are shown in FIGS. 6A and 6B. In an embodiment, in a case of PSFCH, a PSFCH resource in time may be (pre-)configured in resource pool information when sidelink HARQ feedback is activated in a higher layer. The time resource in which the PSFCH is transmitted may be (pre-)configured as one value of 0, 1, 2 and 4. In this case, '0' may mean that PSFCH resources are not used. '1', '2' and '4' may mean that the PSFCH resources are transmitted in slots 1, 2 and 4, respectively.

In FIG. 6A, shown is a structure of a slot in which no PSFCH resource is configured. In FIG. 6B, shown is a structure of a slot in which a PSFCH resource is configured.

In an embodiment, PSCCH/PSSCH/PSFCH may be allocated on one or more subchannels in the frequency. Subchannel allocation may refer to the description as described above in connection with FIG. 3. Referring to FIGS. 6A and 6B to describe mapping of PSCCH/PSSCH/PSFCH in time, one or more symbols may be used as a region 602 for automatic gain control (AGC) before the TX UE transmits PSSCH/PSSCH/PSFCH in a corresponding slot 601. In the case that the symbol(s) is to be used for the AGC, a method of repetitively transmitting a signal of another channel in the symbol region may be considered. In this case, for the signal of the other channel to be repeated, a portion of the PSCCH symbol or PSSCH symbol may be considered. Alternatively, a preamble may be transmitted in the AGC region. In the case of transmission of the preamble signal, it has an advantage of further reduction of AGC performance time than in the method of repetitively transmitting signals of the other channel. When the preamble signal is transmitted for AGC, a certain sequence may be used for the preamble signal 602, in which case a sequence such as PSSCH demodulation reference signal (DMRS), PSCCH DMRS, channel state information reference signal (CSI-RS), etc., may be used for the preamble. In an embodiment of the disclosure, the sequence used for the preamble is not limited to the above example.

Furthermore, referring to FIGS. 6A and 6B, in early symbols of the slot, control information relating to resource allocation may be transmitted in the first stage SCI in a PSCCH 603 and the other control information may be transmitted in the second stage SCI in a PSSCH region 604. Data scheduled by the control information may be transmitted in a PSSCH 605. In this case, a time position where the second stage SCI is transmitted may be mapped from a symbol in which a first PSSCH DMRS 606 is transmitted. The time position where the PSSCH DMRS 606 is transmitted may be different between the slot in which the PSFCH is transmitted and the slot in which the PSFCH is not transmitted as shown in FIGS. 6A and 6B. FIG. 6A shows a physical channel for transmitting feedback information, a PSFCH 607, located in a tailing portion of the slot. In this case, the UE that has transmitted or received the PSSCH 605 may be prepared to transmit or receive the PSFCH 607 by securing a certain empty guard between the PSSCH 605 and PSFCH 607. Furthermore, after transmission or reception of the PSFCH 607, a guard that has been empty for a certain period of time may be secured.

Figure 7:
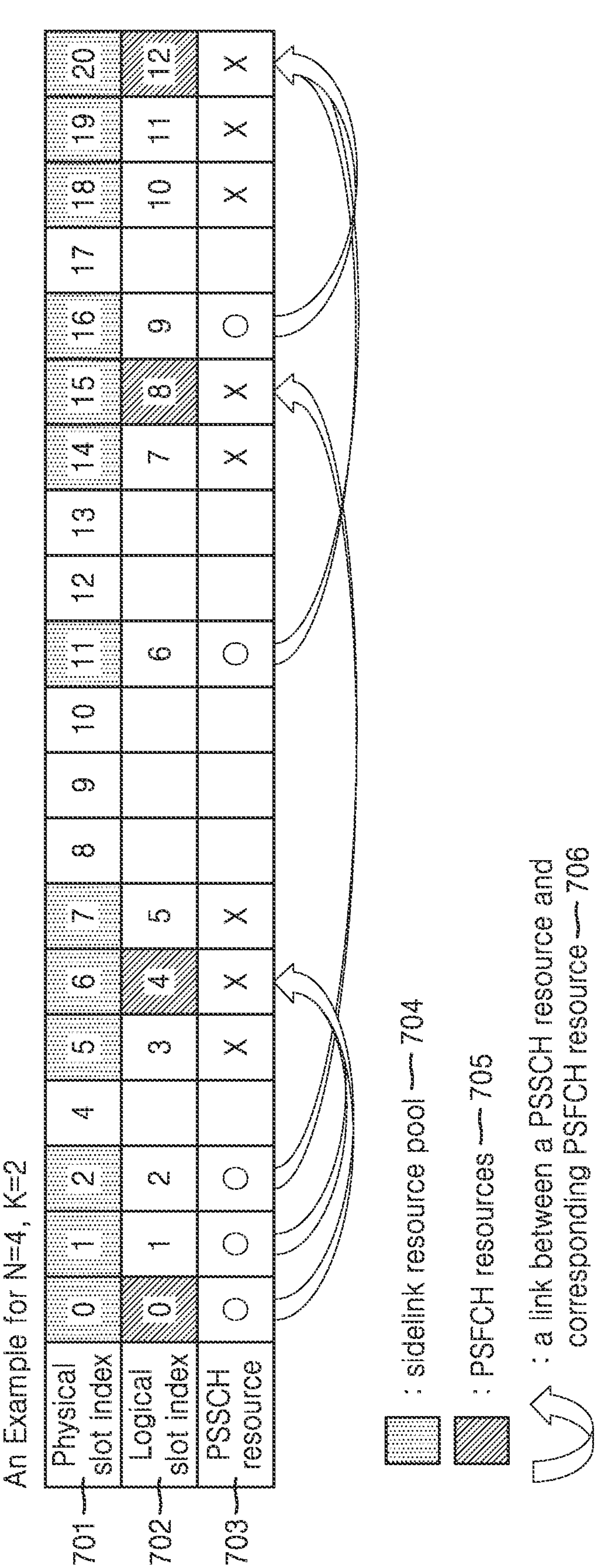
FIG. 7 is a diagram for describing how to determine time resources in which to transmit a physical sidelink feedback channel (PSFCH) in sidelink, according to an embodiment of the disclosure.

FIG. 7 is a diagram for describing how to determine time resources in which to transmit a PSFCH in sidelink, according to an embodiment of the disclosure.

Referring to FIG. 7, feedback information (acknowledgment (ACK) or non-acknowledgment (NACK)) for a transmitted PSSCH may be signaled in the PSFCH. Furthermore, time resources in which to transmit and receive the PSFCH may be determined by a resource position in which the PSSCH resource is transmitted and the following parameter settings:

- a transmission interval N of the PSFCH may be configured in the resource pool, and the value may be a logical slot unit of N=0, 1, 2 or 4.
- a minimum time difference K between the PSSCH and the PSFCH may be configured in the resource pool, and the value may be a logical slot unit of K=2 or 3.

The parameter settings for the resource pool may mean to be (pre-)configured. The logical slot unit may mean the slot available for sidelink being sequentially mapped. This may refer to the description as described above in connection with FIG. 3. Furthermore, when the parameter N=0, it may mean that the PSFCH resource is not configured in the resource pool. When values of N and K are set, the position of the time resource in which to transmit and receive the PSFCH may be defined to be a first slot that includes the PSFCH resource after K slots from the slot in which the PSSCH is transmitted. The UE to transmit the PSFCH may transmit the PSFCH at the position, and the UE to transmit the PSSCH and receive a corresponding PSFCH (including ACK or NACK information) may expect to receive the PSFCH in the slot. This is shown in FIG. 7. In FIG. 7, positions of time resources in which to transmit the PSFCH are shown when N=4 and K=2. Specifically, in FIG. 7, only slots 704 belonging to the resource pool among physical slots 701 may be mapped to logical slots 702, and time positions 705 in which to transmit the PSFCH may be determined in the logical slots 702 according to the PSFCH interval N=4. In 703, slots in which the PSSCH is transmitted are marked ‘O’ and slots in which the PSSCH is not transmitted are marked ‘X’. In this case, the position of the slot available to transmit and receive the PSFCH for the transmitted PSSCH is shown with consideration for K=2.

FIGS. 8A to 8D illustrate DRX inactive time (or off-duration) and active time (or on-duration) determined based on parameters configured for DRX when the DRX is performed in sidelink, according to an embodiment of the disclosure.

Referring to FIGS. 8A to 8D, the UE may decode control information and data information for data reception in a section corresponding to the DRX active time. Alternatively, decoding may not be performed on the control information and data information for data reception in the section corresponding to the DRX inactive time. Furthermore, reception of the PSFCH may not be performed neither. SCI in sidelink may include first SCI, which is control information transmitted in the PSCCH and second SCI, which is control information transmitted in the PSCCH. The data information may also be transmitted in the PSSCH. It may be assumed that the control information and the data information are always transmitted simultaneously in sidelink. Hence, a time (slot) to receive the control information may be the same as a time (slot) to receive the data information. Furthermore, feedback information (ACK or NACK) for the PSSCH may be transmitted in the PSFCH, and the UE that has transmitted the PSSCH may receive the feedback information. Description of the position of the resource transmitted and received in the PSFCH may refer to the aforementioned description of FIG. 7.

For parameters for determining the DRX inactive time and active time of sidelink, the following parameters may be considered. However, it is noted that the parameters for determining the DRX inactive time and active time are not limited to the following parameters. It is also noted that some of the following parameters may not be used for sidelink DRX.

DRX Related Parameters

Figure 8A:
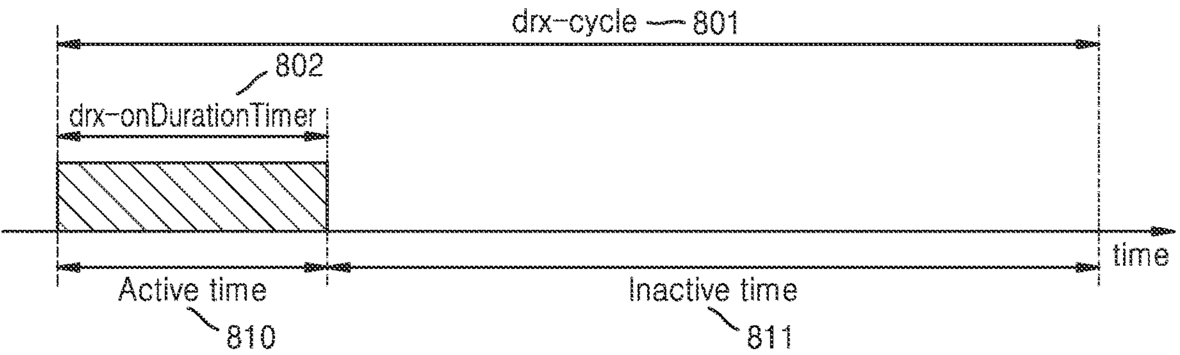
FIG. 8A illustrates discontinuous reception (DRX) inactive time (or off-duration) and active time (or on-duration) determined based on parameters configured for DRX when the DRX is performed in sidelink, according to an embodiment of the disclosure.
Figure 8B:
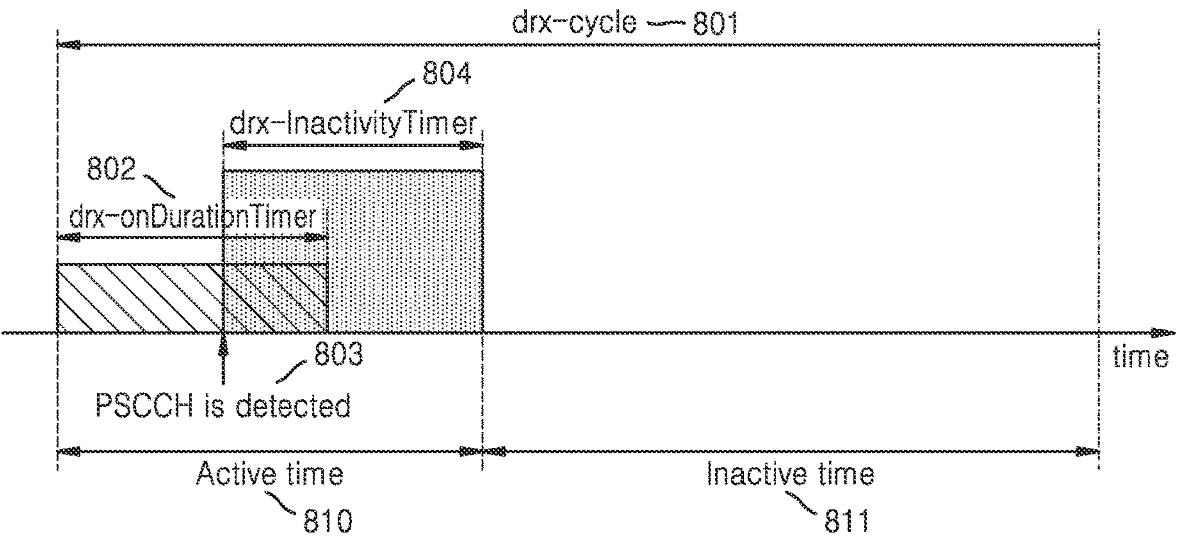
FIG. 8B illustrates DRX inactive time (or off-duration) and active time (or on-duration) determined based on parameters configured for DRX when the DRX is performed in sidelink, according to an embodiment of the disclosure.
Figure 8C:
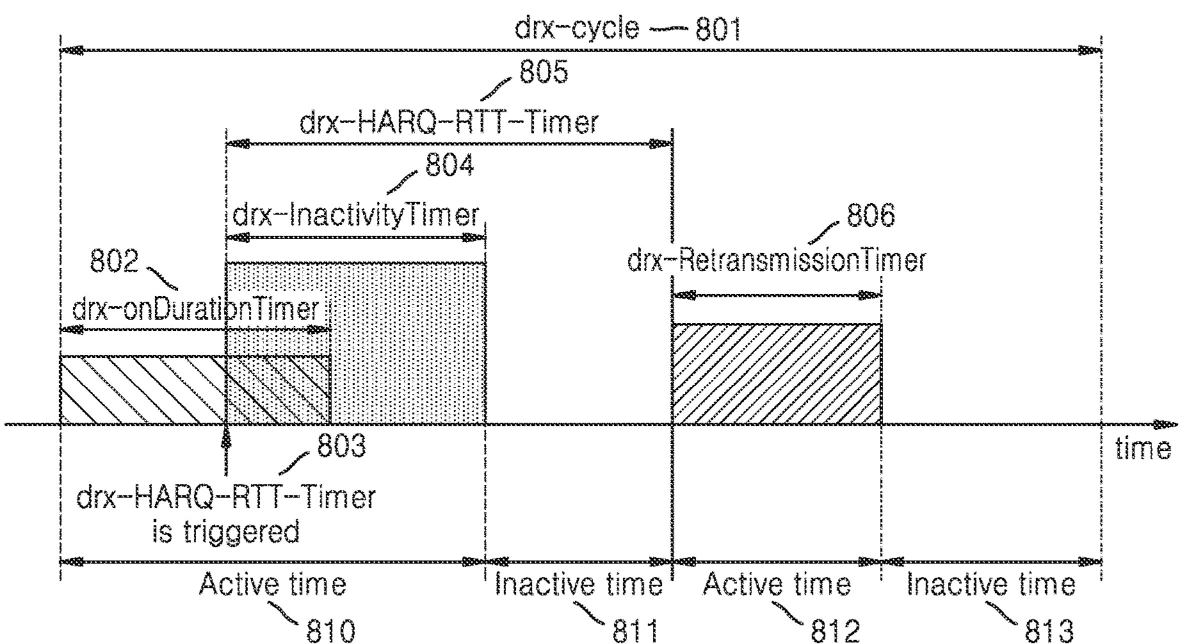
FIG. 8C illustrates DRX inactive time (or off-duration) and active time (or on-duration) determined based on parameters configured for DRX when the DRX is performed in sidelink, according to an embodiment of the disclosure.
Figure 8D:
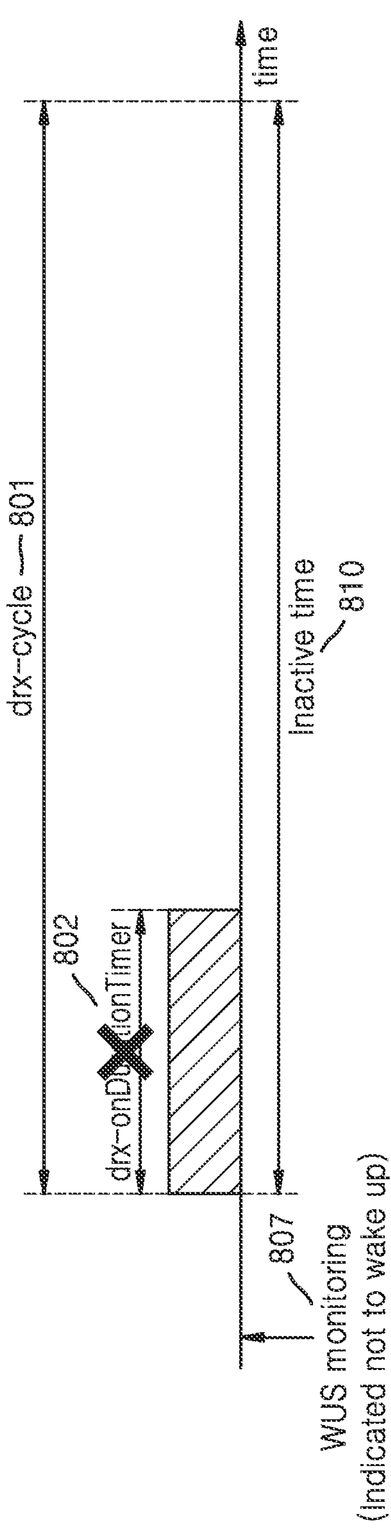
FIG. 8D illustrates DRX inactive time (or off-duration) and active time (or on-duration) determined based on parameters configured for DRX when the DRX is performed in sidelink, according to an embodiment of the disclosure.

- drx-cycle
  - it represents a period in which DRX is applied, and a start position drx-StartOffset of the drx-cycle 801 may be set. As shown in FIG. 8A, sections of inactive time 810 and active time 811 may be configured in the drx-cycle. The drx-cycle having a long cycle and a short cycle may be configured in sidelink.
- drx-onDurationTimer
  - it is a time operating as the DRX active time (or on-duration) in the drx-cycle 810, and may correspond to the DRX active time 810 until expiration from start of a drx-onDurationTimer 802. The remaining section of the drx-cycle 801 from when the drx-onDurationTimer 802 expires may be the DRX inactive time 811. An example where only the drx-onDurationTimer 802 is defined in sidelink and the DRX inactive time 810 and active time 811 are operated is shown in FIG. 8A.
- drx-InactivityTimer
  - when sidelink control information is received (803) in the drx-cycle 801 before expiration of the drx-onDurationTimer 802, the DRX active time may extend (810) until expiration of a drx-InactivityTimer 804 starting from when the control information is received. The remaining section of the drx-cycle 801 from when the drx-InactivityTimer 804 expires may be the DRX inactive time 811. An example where the drx-onDurationTimer 802 and the drx-InactivityTimer 804 are defined in sidelink and the DRX inactive time 810 and active time 811 are operated is shown in FIG. 8B.

drx-HARQ-RTT-Timer when retransmission is performed in sidelink, the UE may trigger (803) a drx-HARQ-RTT-Timer 805 in the DRX active time 811. When the sidelink control information is received or when the sidelink control information is received and position information for retransmission is indicated in the sidelink control information (first SCI), a triggering condition of the drx-HARQ-RTT-Timer 805 in sidelink may be applied to the drx-HARQ-RTT-Timer 805 according to the information until the next retransmission is received. When the drx-HARQ-RTT-Timer 805 expires, the UE may operate in the DRX active time 811 for receiving the retransmission. In this case, the DRX active time 811 may be a section in which a drx-RetransmissionTimer 806 operates. This will now be described in detail. As described above, as the position information of resources for initial transmission and retransmission (including information about whether there is a resource for retransmission) is indicated, the drx-HARQ-RTT-Timer 805 may be assumed and defined to be a time gap between the resources for initial transmission and retransmission or between resources for retransmission indicated in the first SCI. When it is indicated that there is no resource for retransmission in the received first SCI, the drx-HARQ-RTT-Timer 805 may not operate. An example where the drx-onDurationTimer 802, the drx-Inactivity Timer 804, the drx-HARQ-RTT-Timer 805 and the drx-RetransmissionTimer 806 are defined in sidelink and the DRX inactive time 810 and active time 811 are operated is shown in FIG. 8C.

drx-RetransmissionTimer when sidelink retransmission is performed, the drx-RetransmissionTimer 806 may operate from when the drx-HARQ-RTT-Timer 805 expires. Hence, the drx-RetransmissionTimer does not operate in a time section where the drx-HARQ-RTT-Timer 805 operates. Furthermore, in sidelink, the drx-RetransmissionTimer 806 may be determined to have a fixed value of one slot or one subframe. In this case, the drx-RetransmissionTimer 805 may not be defined. The disclosure is not limited thereto. For example, in sidelink, the drx-RetransmissionTimer may be set to a value of one or more slots or one or more subframes. Hence, as shown in FIG. 8C, the section where the drx-RetransmissionTimer 806 operates may be set as a DRX active time 812 to receive retransmission of a peer UE. The remaining section of the drx-cycle may be set as a DRX inactive time 813 during which the UE may not receive control and data information.

drx-SlotOffset it may be used for the purpose of controlling a start position to which sidelink DRX is applied when various subcarrier spacing (SCS) is supported.

wake-up signal (WUS) cycle the WUS cycle may be set when a WUS is used in sidelink. It is assumed that the WUS is transmitted according to the WUS cycle, and the UE may monitor the WUS (807) at the position where the WUS is transmitted. Referring to FIG. 8D, shown is an example in which the WUS is used to determine the DRX inactive time and active time. When the WUS indicates that the UE is not to wake up as shown in FIG. 8D, the UE may not operate the drx-onDurationTimer 802 in the drx-cycle 801 and the whole drx-cycle section may be set to the DRX inactive time 810. Alternatively, when the WUS indicates that the UE is to wake up, the UE may perform an operation as in FIG. 8A, 8B or 8C depending on the configured DRX parameter.

According to the above description, the DRX active time (or on-duration) may be defined on the following conditions:

when the DRX cycle is set in sidelink, the active time may include the following things:

when the drx-onDurationTimer, the drx-InactivityTimer or the drx-RetransmissionTimer operates, some of the above parameters may not be used for sidelink DRX, as described above. Alternatively, another parameter may be additionally considered. It is noted that this may vary depending on sidelink broadcast, unicast and groupcast transmission methods. How to configure the above parameter information is not limited to a particular method in the disclosure. The information may be (pre-)configured, and in the case of unicast, may be configured by PC5-RRC or sidelink MAC-CE.

An embodiment of the disclosure provides a UE operation in which a resource for a PSFCH is configured in the resource pool, a UE in the resource pool is able to receive the PSFCH, and the UE handles (receives or not receive) the PSFCH when the UE performs sidelink DRX. Specifically, it is to define a UE operation for a TX UE to handle HARQ ACK reception when a PSFCH resource is configured in a sidelink DRX inactive time section. For this, the above methods considered will be specifically described in the following embodiments. Furthermore, the UE operation will be specifically provided.

First Embodiment

The first embodiment provides a UE operation in which a resource for a PSFCH is configured in the resource pool, a UE in the resource pool is able to receive the PSFCH, and the UE handles the PSFCH when the UE performs sidelink DRX, which is a method by which a TX UE disables sidelink HARQ feedback through SCI indication to prevent the RX UE from transmitting the PSFCH. This may correspond to method 1 among the proposed methods. The SCI indication may be made by an HARQ feedback enable/disable indicator in the second SCI.

Figure 9:
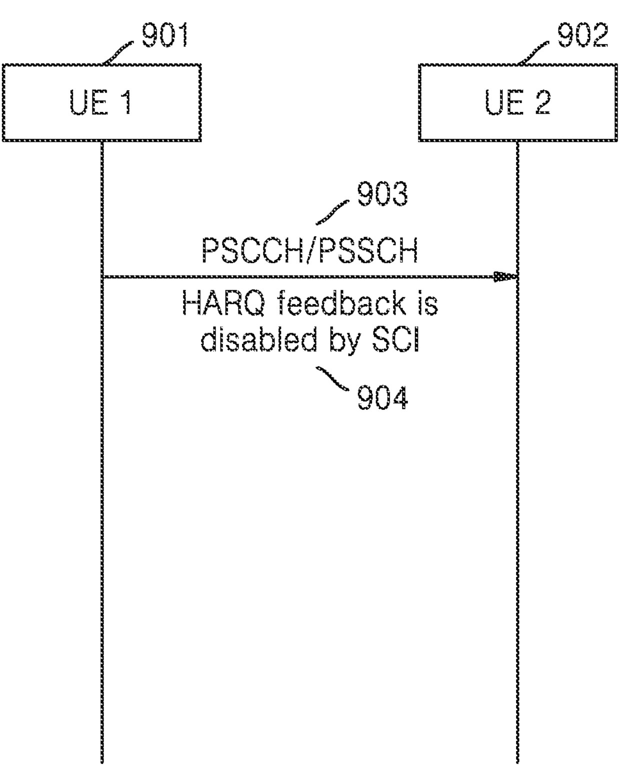
FIG. 9 illustrates a PSFCH handling operation in method 1, according to an embodiment of the disclosure.

FIG. 9 illustrates a PSFCH handling operation in method 1, according to an embodiment of the disclosure.

Specifically, in FIG. 9, when a resource for the PSFCH is configured in a resource pool for UE1 901, a UE in the resource pool is able to receive the PSFCH and the UE performs sidelink DRX, PSFCH reception for PSSCH transmission 903 of UE1 may not be allowed. For this, in method 1, UE1 901 may indicate through the second SCI that UE2 902 is not to transmit the PSFCH (904). In FIG. 9, it is noted that UE2 902 may refer to a UE that receives the PSSCH transmission of the UE1 901 and may correspond to one or more UEs. In the case of unicast according to method 1 on the assumption that sidelink HARQ feedback is supported in unicast and groupcast, UE2 902 that has established PC-5 RRC link with UE1 901 may not feed back feedback information (ACK or NACK) for the PSSCH reception to UE1 in the PSFCH according to method 1 after receiving PSCCH/PSSCH 903 from UE1. Furthermore, in the case of groupcast according to method 1, UEs in the same group with UE1 901 may not feed back feedback information (ACK or NACK) for the PSSCH reception to UE1 in the PSFCH according to method1 after receiving the PSSCH from UE1.

Second Embodiment

The second embodiment provides a UE operation in which a resource for a PSFCH is configured in the resource pool, a UE in the resource pool is able to receive the PSFCH, and the UE handles the PSFCH when the UE performs sidelink DRX, which is a method by which when the drx-PSFCH-Timer is defined in sidelink DRX and the timer expires after operating from a slot in which the PSCCH/PSSCH is transmitted, a TX UE receives the PSFCH in a corresponding slot. This may correspond to method 2 among the proposed methods. It is noted that the term drx-PSFCH-Timer may be replaced by other terms. In an embodiment, according to the method 2, the UE may perform PSFCH reception when the drx-PSFCH-Timer expires. In this case, a method by which a slot to receive the PSFCH is defined as the DRX active time to allow reception of both control information (first SCI or second SCI) and data information may be considered. In an embodiment, as described above in connection with FIG. 6A, a position where the PSFCH is transmitted in the slot may correspond to a symbol located in the tailing portion of the slot. However, in a case that a method by which a slot for receiving the PSFCH is defined as the DRX active time is used, as shown in FIG. 6A, reception of data information and control information (the first SCI or the second SCI) located in a leading portion of the same slot may also be allowed together. Alternatively, in another embodiment, a method by which a slot for receiving the PSFCH may only receive the PSFCH but is not allowed to receive the control information (the first SCI or the second SCI) and the data information may also be considered. In this case, it may be interpreted that sidelink DRX and PSFCH reception are independent from each other. In other words, it may be interpreted that PSFCH reception is possible regardless of DRX configuration, and drx-PSFCH-Timer may not be defined. The drx-PSFCH-Timer may be only to describe a transmission position of the PSFCH according to a method of determining time resource positions where a PSSCH resource is transmitted and a corresponding PSFCH is transmitted and received as described in connection with FIG. 7. In an embodiment, the slot for receiving the PSFCH may be determined to be one or more slots. The drx-PSFCH-Timer may be determined according to a method of determining time resource positions where the PSSCH resource is transmitted and the corresponding PSFCH is transmitted and received. In other words, the drx-PSFCH-Timer may be defined to be a first slot including the PSFCH resource determined by the transmission interval N of the PSFCH resource after K slots from a slot where the PSSCH is transmitted. In this case, the value of K is a minimum time difference K between the PSSCH and the PSFCH, which may be configured in the resource pool, and the value of which may be a logical slot unit of K=2 or 3.

Furthermore, the value of N is a transmission interval N of the PSFCH resource, which may be configured in the resource pool, and the value may be a logical slot unit of N=0, 1, 2 or 4.

This may refer to the description as described above in connection with FIG. 7.

Figure 10:
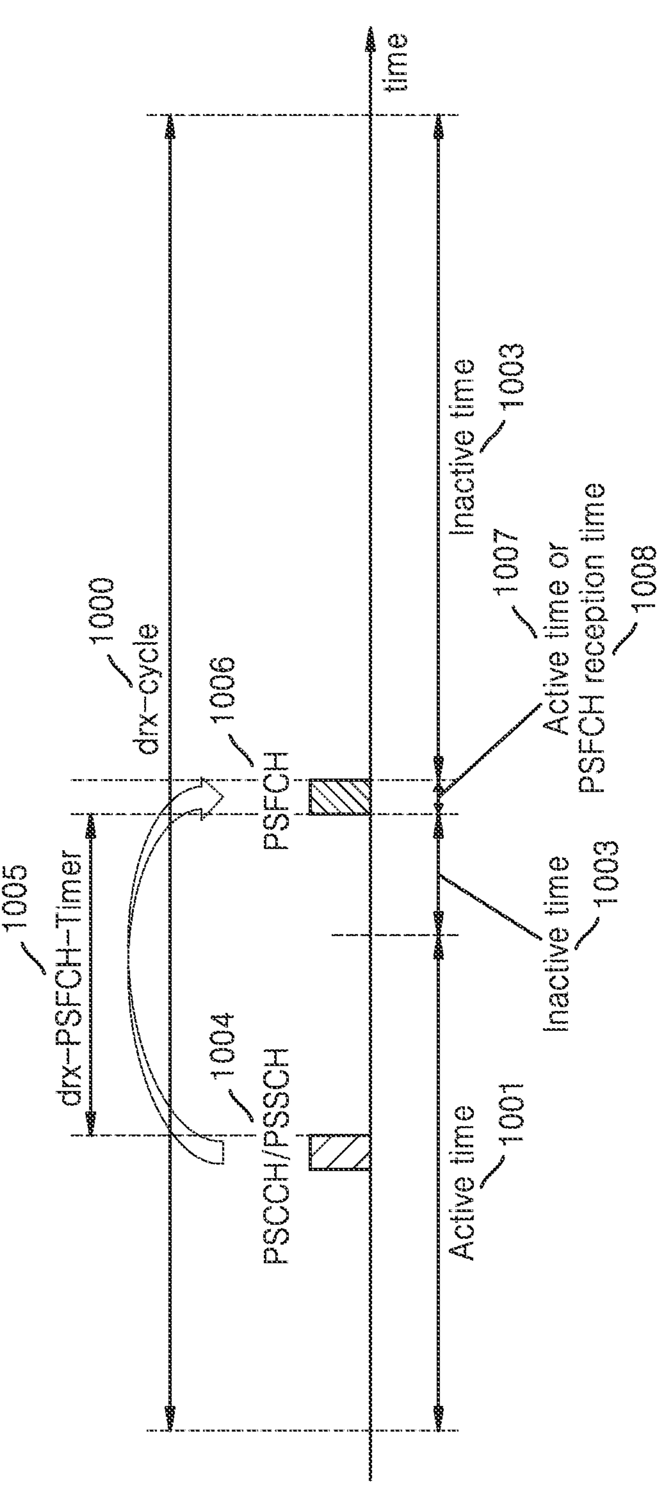
FIG. 10 illustrates an operation enabling PSFCH reception by defining a drx-PSFCH-Timer for sidelink DRX, according to an embodiment of the disclosure.

FIG. 10 illustrates an operation enabling PSFCH reception by defining a drx-PSFCH-Timer for sidelink DRX, according to an embodiment of the disclosure.

Referring to FIG. 10, shown is an occasion when the UE performs sidelink DRX, drx-cycle 1000 is set, and an active time 1001 and an inactive time 1003 are operated. According to the method 2, when the drx-PSFCH-Timer is defined, and the drx-PSFCH-Timer 1005 starting from a slot where a PSCCH or a PSSCH 1004 is transmitted expires, the TX UE receives a PSFCH 1006 in a corresponding slot. When a time at which the drx-PSFCH-Timer 1005 expires corresponds to an active time of the drx-cycle 1000, the UE may be able to receive the PSFCH 1006. In FIG. 10, shown is an occasion when the time at which the drx-PSFCH-Timer 1005 expires corresponds to the inactive time 1003. In this case, a slot for receiving the PSFCH 1006 in the inactive time 1003 may be defined to be an active time 1007. In the slot, it may be possible to receive both control information (first SCI or second SCI) and data information. Alternatively, the slot for receiving the PSFCH 1006 may be defined as a PSFCH reception time 1008. The difference from the DRX active time is that the PSFCH reception time is only allowed to receive the PSFCH but not allowed to receive the control information (the first SCI or the second SCI) and the data information. It is noted that the PSFCH reception time may be replaced by other terms.

Figure 11:
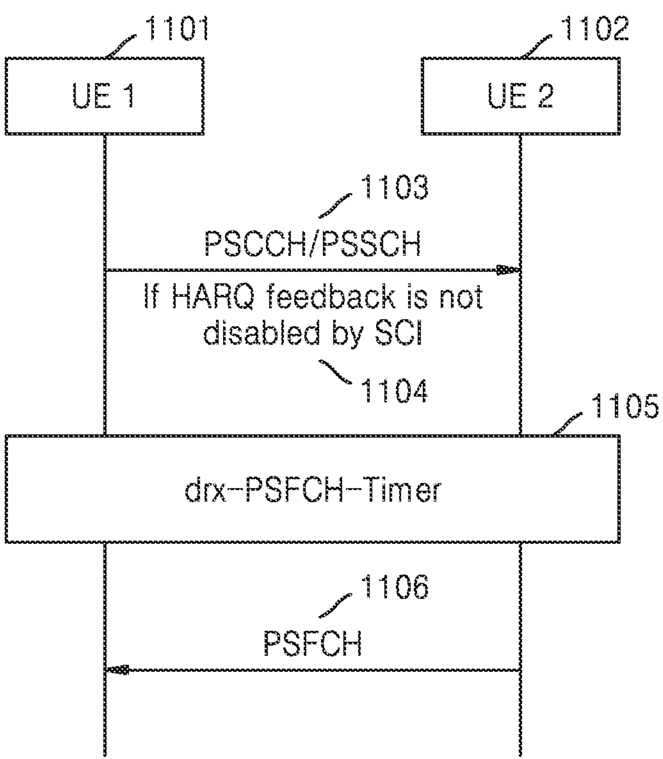
FIG. 11 illustrates a PSFCH handling operation in method 2, according to an embodiment of the disclosure.

FIG. 11 illustrates a PSFCH handling operation in method 2, according to an embodiment of the disclosure.

Referring to FIG. 11, when a resource for the PSFCH is configured in a resource pool for UE1 1101, a UE in the resource pool is able to receive the PSFCH and the UE performs sidelink DRX, the drx-PSFCH-Timer may be used to allow PSFCH reception for PSSCH transmission 1103 of UE1. For this, according to the method 2, when the UE1 1101 and UE2 1102 agree the sidelink DRX configuration including the drx-PSFCH-Timer, the UE1 1101 transmits the PSSCH 1103 and HARQ feedback for the resource is not disabled 1104, UE2 1102 transmits a PSFCH 1106 by using the drx-PSFCH-Timer 1105. In this case, how to set the drx-PSFCH-Timer refers to the proposed method. In an embodiment, it is noted that UE2 1102 may refer to the UE that has received the PSSCH transmission of the UE1 1101 and may correspond to one or more UEs. In the case of unicast according to the method 2 on assumption that sidelink HARQ feedback is supported in unicast and groupcast, UE2 1102 that has established PC-5 RRC link with UE1 1101 may feed back feedback information (ACK or NACK) for the PSSCH reception to UE1 in the PSFCH according to the method 2 after receiving the PSCCH/PSSCH 1103 from UE1. Furthermore, in the case of groupcast according to method 2, UEs in the same group with UE 1 1101 may feed back feedback information (ACK or NACK) for the PSSCH reception to UE1 in the PSFCH according to the method 2 after receiving the PSSCH from UE1.

Third Embodiment

The third embodiment provides a UE operation in which a resource for a PSFCH is configured in the resource pool, a UE in the resource pool is able to receive the PSFCH, and the UE handles the PSFCH when the UE performs sidelink DRX, in which case the TX UE is defined as unable to receive the PSFCH in the sidelink DRX inactive time. Hence, the PSFCH may be received when the PSFCH is in the DRX active time section. Otherwise (when the PSFCH is in the DRX inactive time section), the RX UE is prevented from transmitting the PSFCH by disabling sidelink HARQ feedback through indication of SCI. This may correspond to method 3 among the proposed methods. The SCI indication may be made by an HARQ feedback enable/disable indicator in the second SCI. In method 3, the DRX active time section for determining whether to transmit the PSFCH may be limited only to a section determined by the drx-onDurationTimer (see FIG. 8A). Furthermore, the DRX inactive time section may be a time section that is not included in the DRX active time in the drx-cycle. As it may vary depending on the DRX active time situation when the drx-InactivityTimer is also considered (see FIG. 8B), it may be difficult to determine whether a PSFCH resource position corresponding to PSSCH transmission of the UE corresponds to the DRX active time.

Figure 12A:
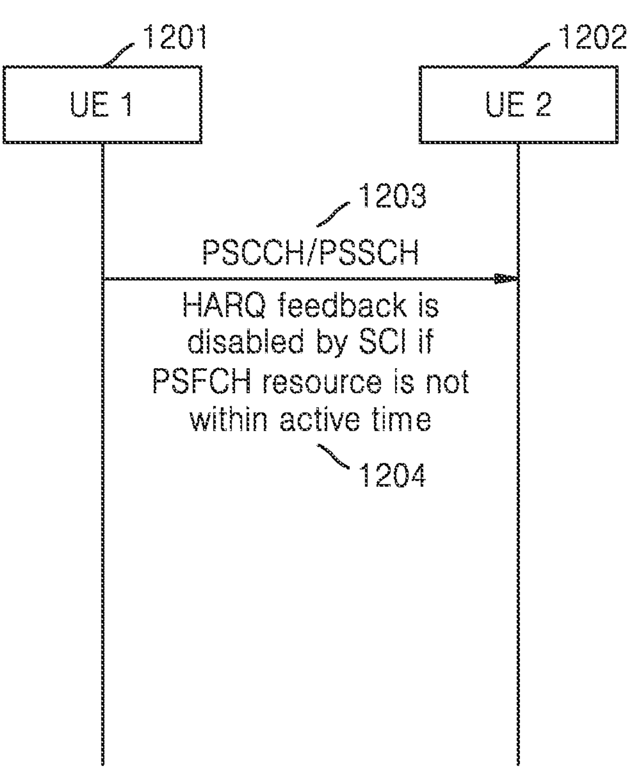
FIG. 12A illustrates a PSFCH handling operation in method 3, according to an embodiment of the disclosure.
Figure 12B:
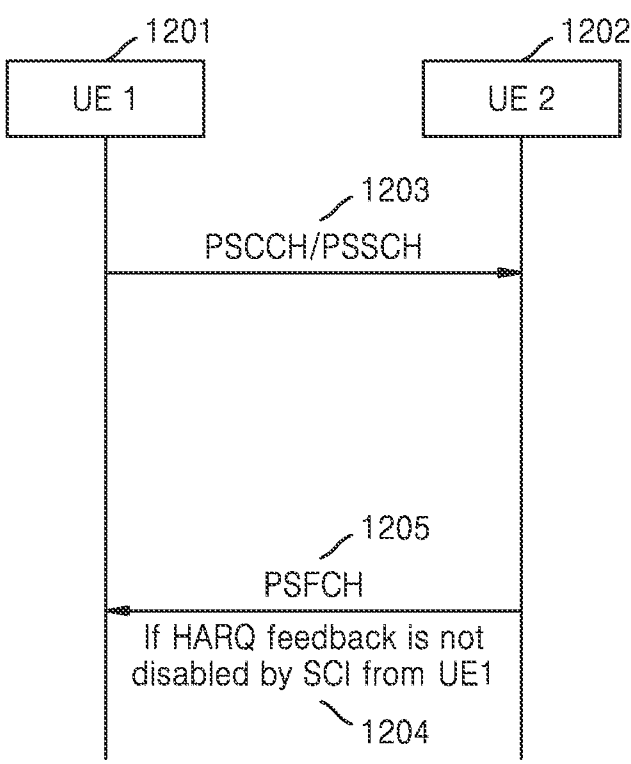
FIG. 12B illustrates a PSFCH handling operation in method 3, according to an embodiment of the disclosure.

FIGS. 12A and 12B illustrate a PSFCH handling operation in method 3, according to an embodiment of the disclosure.

Referring to FIGS. 12A and 12B, it is a method allowed when a resource for the PSFCH is configured in a resource pool for UE 1 1201, a UE in the resource pool is able to receive the PSFCH and the UE performs sidelink DRX, and when a PSFCH resource corresponding to the PSFCH reception for the PSSCH transmission 1203 of UE1 is in the sidelink DRX active time.

In an embodiment, referring to FIG. 12A, according to method 3, UE1 1201 indicates through the second SCI that UE2 1202 is not to transmit the PSFCH (1204) when it is determined that a PSFCH resource corresponding to transmission of the PSSCH from UE1 1201 is not included in the active time.

In another embodiment, referring to FIG. 12B, when it is determined that UE1 1201 transmits a PSSCH and a corresponding PSFCH resource is included in the sidelink DRX active time, and when HARQ feedback is not disabled for a resource corresponding to transmission of the PSSCH 1203 of UE1 1201, UE2 1202 may transmit a PSFCH 1205 and UE1 1201 may receive the PSFCH 1205.

In FIGS. 12A and 12B, it is noted that UE2 1202 may refer to the UE that has received the PSSCH transmission of UE1 1201 and may correspond to one or more UEs. In a case of unicast according to method 3 on assumption that sidelink HARQ feedback is supported in unicast and groupcast, UE2 1202 that has established PC-5 RRC link with UE1 1201 may feed back feedback information (ACK or NACK) for the PSSCH reception to UE1 in the PSFCH when a corresponding PSFCH resource is in the sidelink DRX active time. Furthermore, in a case of groupcast according to method 3, when receiving the PSSCH from UE1 and determining that a corresponding PSFCH resource is in the sidelink DRX active time, UEs in the same group with UE 1 1201 may feed back feedback information (ACK or NACK) for the PSSCH reception to UE1 in the PSFCH. In the case of groupcast in method 3, each of the UEs in the group may have different DRX active time/inactive time, but when a PSFCH resource for the PSSCH is not included in the sidelink DRX active time, at least one UE in the group, e.g., UE1 1201 as shown in FIG. 12A, may indicate through the second SCI that all the UEs in the group are not to transmit an PSFCH (1204).

Fourth Embodiment

The fourth embodiment provides a UE operation in which a resource for a PSFCH is configured in the resource pool, a UE in the resource pool is able to receive the PSFCH, and the UE handles the PSFCH when the UE performs sidelink DRX, in which case the TX UE may be defined as one unable to receive the PSFCH in the sidelink DRX inactive time and accordingly, a PSSCH resource selected in mode 2 may be reselected when it is determined that the PSFCH is not in the DRX active time section. This may correspond to method 4 among the proposed methods. In method 4, how to figure out a time position of a PSFCH transmission resource for the PSSCH resource selected in mode 2 refers to the aforementioned description in connection with FIG. 7. In method 4, the DRX active time section for determining whether to transmit the PSFCH may be limited to a section determined by the drx-onDurationTimer (see FIG. 8A). Furthermore, the DRX inactive time section may be a time section that is not included in the DRX active time in the drx-cycle. As it may vary depending on the DRX active time condition when the drx-InactivityTimer is also considered as described above in connection with FIG. 8B, it may be difficult to determine whether a PSFCH resource position corresponding to PSSCH transmission of the UE corresponds to the DRX active time.

Figure 13:
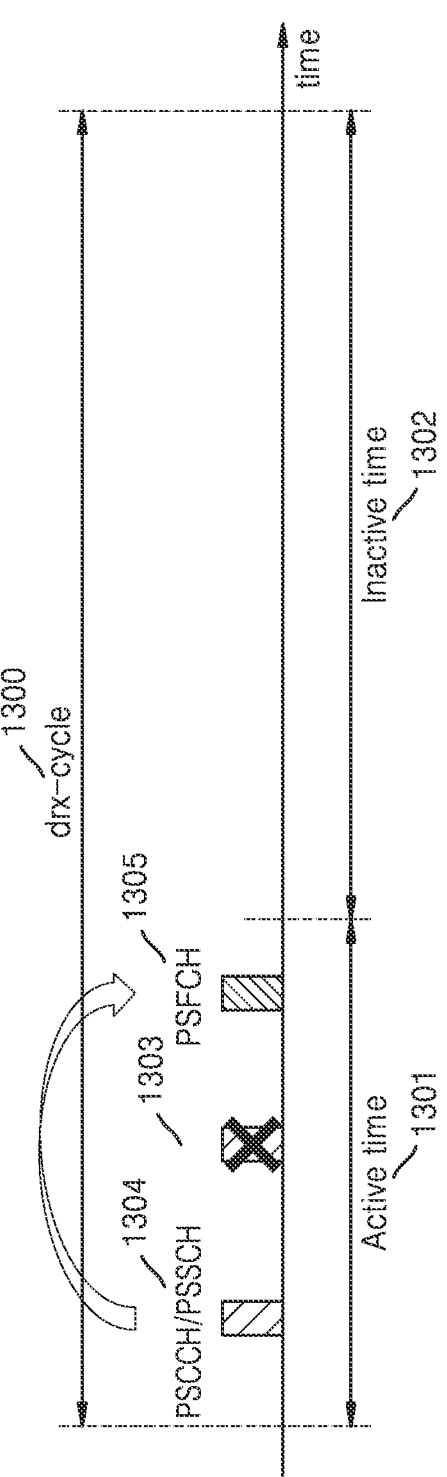
FIG. 13 illustrates an operation to reselect a physical sidelink shared channel (PSSCH) resource selected in mode 2 when it is determined that a PSFCH is not in a DRX active time section, according to an embodiment of the disclosure.

FIG. 13 illustrates an operation to reselect a PSSCH resource selected in mode 2 when it is determined that a PSFCH is not in a DRX active time section, according to an embodiment of the disclosure.

Referring to FIG. 13, shown is an occasion when the UE performs sidelink DRX, drx-cycle 1300 is set, and an active time 1301 and an inactive time 1302 are operated. In FIG. 13, assumed is a case that a resource 1303 is selected according to operation of mode 2. However, it is also assumed that the position of a PSFCH transmission resource for the resource 1303 is determined as not in the DRX active time section. Hence, in this case, the UE may perform reselection on the selected resource 1303. In FIG. 13, shown is an occasion when a resource 1304 selected by the reselection and a corresponding PSFCH transmission resource 1305 are in the DRX active time section. In this case, the UE may perform PSCCH/PSSCH transmission 1304.

Figure 14A:
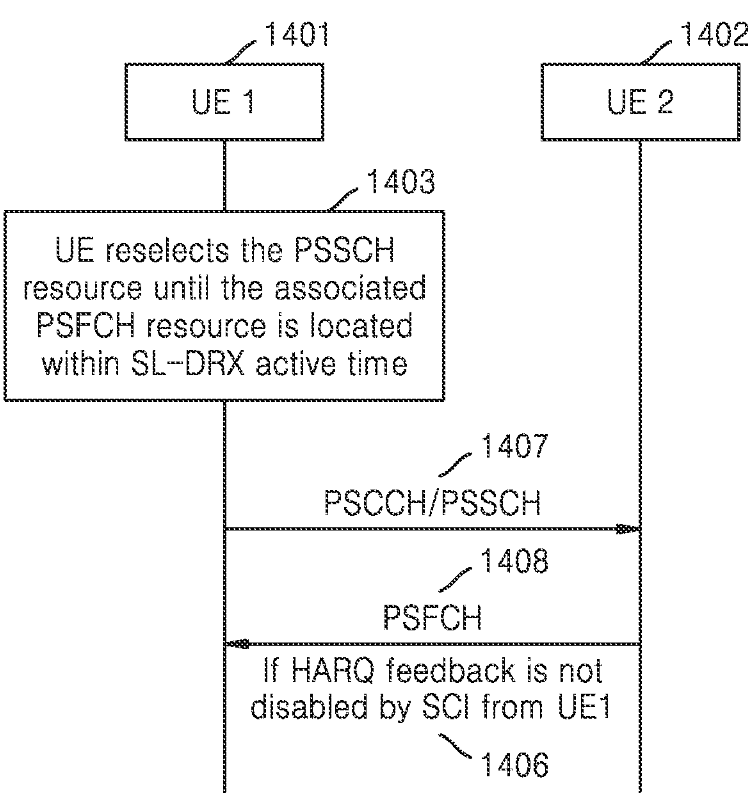
FIGS. 14A to 14C illustrate a PSFCH handling operation in method 4, according to an embodiment of the disclosure.
Figure 14B:
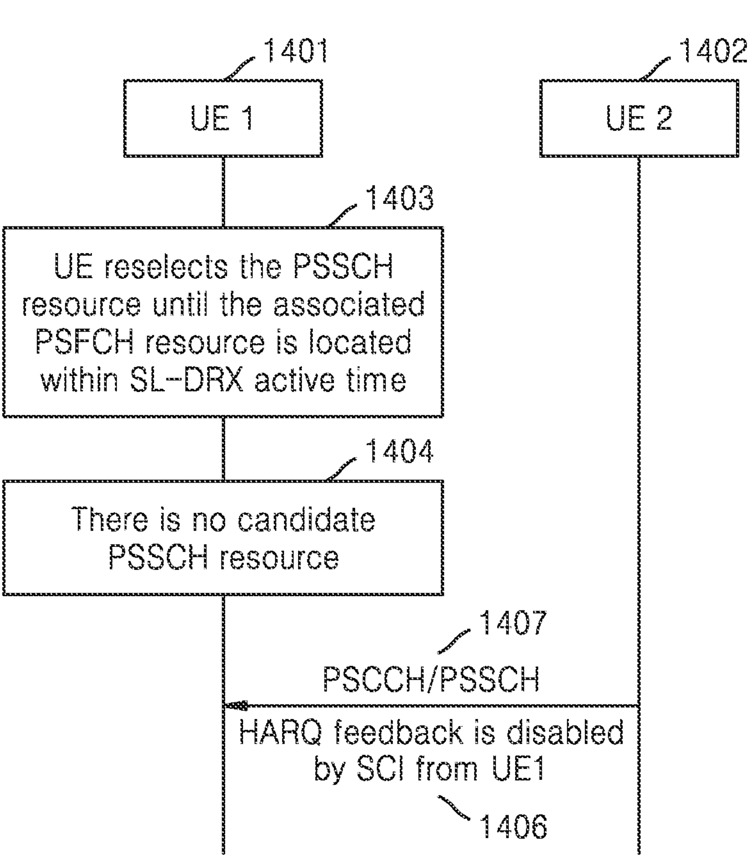
Figure 14C:
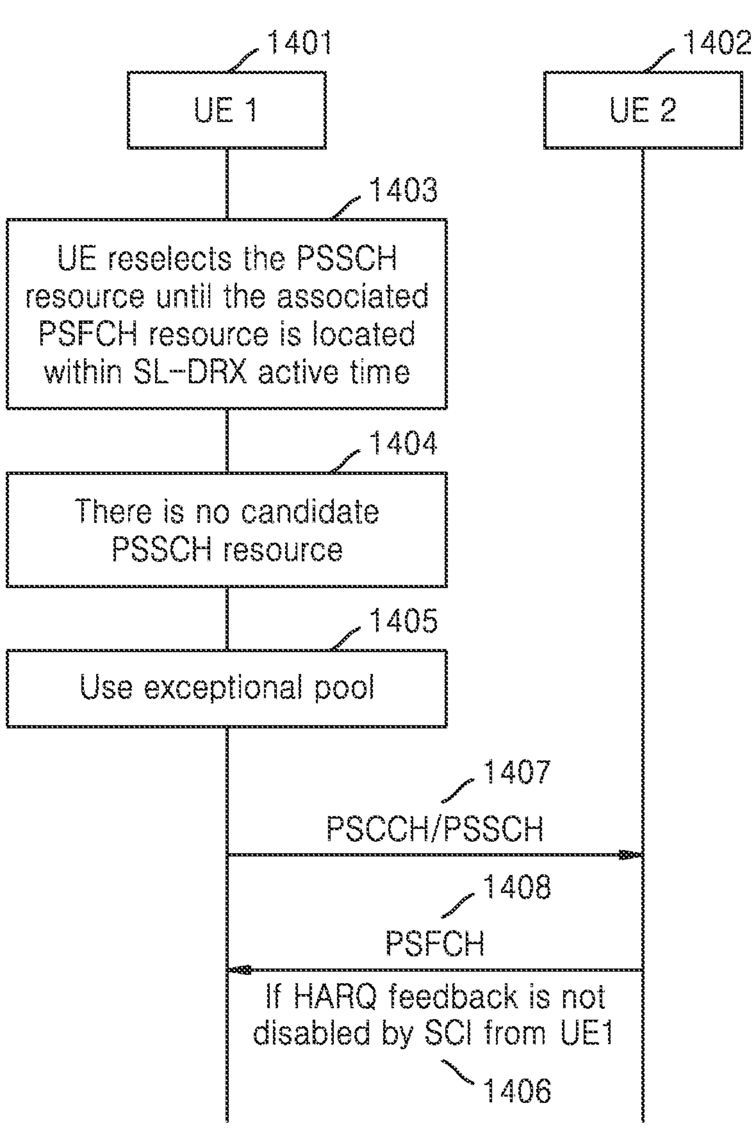

FIGS. 14A to 14C illustrate a PSFCH handling operation in method 4, according to an embodiment of the disclosure.

Referring to FIGS. 14A to 14C, it is a method of reselecting resources according to operation of mode 2 when a resource for the PSFCH is configured in a resource pool for UE1 1401, a UE in the resource pool is able to receive the PSFCH and the UE performs sidelink DRX, and when a PSFCH resource corresponding to the PSFCH reception for PSSCH transmission 1407 of UE1 is not in the sidelink DRX active time.

Referring to FIG. 14A, when the UE1 1401 selects a PSSCH resource in mode 2 and a corresponding PSFCH resource is determined as not included in the sidelink DRX active time as in method 4, UE1 1401 may reselect the resource already selected in operation 1403. In operation 1403, the UE 1401 may continue the procedure for reselecting the resource as long as the position of the PSFCH transmission resource for the selected PSSCH resource is in the DRX active time section. According to the resource selection method of mode 2, the UE1 1401 may make up a set of selectable candidate resources as a result of sensing and randomly select a resource from the set. Hence, the position of the PSFCH transmission resource for the reselected PSSCH resource may not be in the DRX active time section.

In an embodiment, when it is determined that the position of the PSFCH transmission resource for the PSSCH selected through the resource reselection procedure is in the DRX active time section, UE1 1401 may transmit a PSSCH in operation 1407, UE2 1402 may transmit a PSFCH in operation 1408 when HARQ feedback for the resource is not disabled in operation 1406, and UE1 1401 may receive the PSFCH in operation 1408.

Referring to FIG. 14B, proposed is an additional UE operation for an occasion when there is no selectable PSSCH resource for which the position of a PSFCH transmission resource is in the DRX active time section even though reselection is continued in operation 1403. When there is no selectable PSSCH resource in the DRX active time section, UE1 1401 may transmit the PSSCH in operation 1407 and indicate through the second SCI that UE2 1402 is not to transmit the PSFCH in operation 1406.

Referring to FIG. 14C, it is a method different from the method as described above in connection with FIG. 14B, in which case, when there is no selectable PSSCH resource for which the position of a PSFCH transmission resource is in the DRX active time section in operation 1404 even though reselection is continued in operation 1403, UE1 1401 may select a transmission resource from an exceptional pool in operation 1405. The exceptional pool may be understood as a pool that is always available for sidelink transmission and reception independently from sidelink DRX. Furthermore, it is assumed that a PSFCH resource is configured in the exceptional pool. Resource selection from the exceptional pool may be randomly made without performing sensing. Hence, when UE1 1401 transmits the PSSCH in operation 1407 and HARQ feedback for a corresponding resource is not disabled in operation 1406, UE2 1402 may transmit a PSFCH in operation 1408 and UE1 1401 may receive the PSFCH in operation 1408.

Fifth Embodiment

The fifth embodiment provides a UE operation in which a resource for a PSFCH is configured in the resource pool, a UE in the resource pool is able to receive the PSFCH, and the UE handles the PSFCH when the UE performs sidelink DRX, in which case the TX UE may be defined as one unable to receive the PSFCH in the sidelink DRX inactive time and accordingly, PSSCH resource candidates may be made by being limited to those for which PSFCH reception is possible. This may correspond to method 5 among the proposed methods. In method 5, when a PSFCH for the PSSCH resource candidate is in the DRX active time section, the corresponding resource may be classified as a selectable PSSCH resource candidate. In method 5, the UE may control a resource selection window for resource selection to obtain PSSCH resource candidates for which PSFCH reception is possible. Controlling the resource selection window may include a method of securing a resource selection window that extends long in time as long as a packet delay budget (PDB) is satisfied. Furthermore, in method 5, how to figure out a time position of a PSFCH transmission resource for the PSSCH resource selected in mode 2 may correspond to the method as described above in connection with FIG. 7. In method 5, the DRX active time section for determining whether to transmit the PSFCH may be limited only to a section determined by the drx-onDurationTimer (see FIG. 8A). Furthermore, the DRX inactive time section may be a time section that is not included in the DRX active time in the drx-cycle. As it may vary depending on the DRX active time condition when the drx-Inactivity-Timer is also considered as described above in connection with FIG. 8B, it may be difficult to determine whether a PSFCH resource position corresponding to PSSCH transmission of the TX UE corresponds to the DRX active time.

Figure 15:
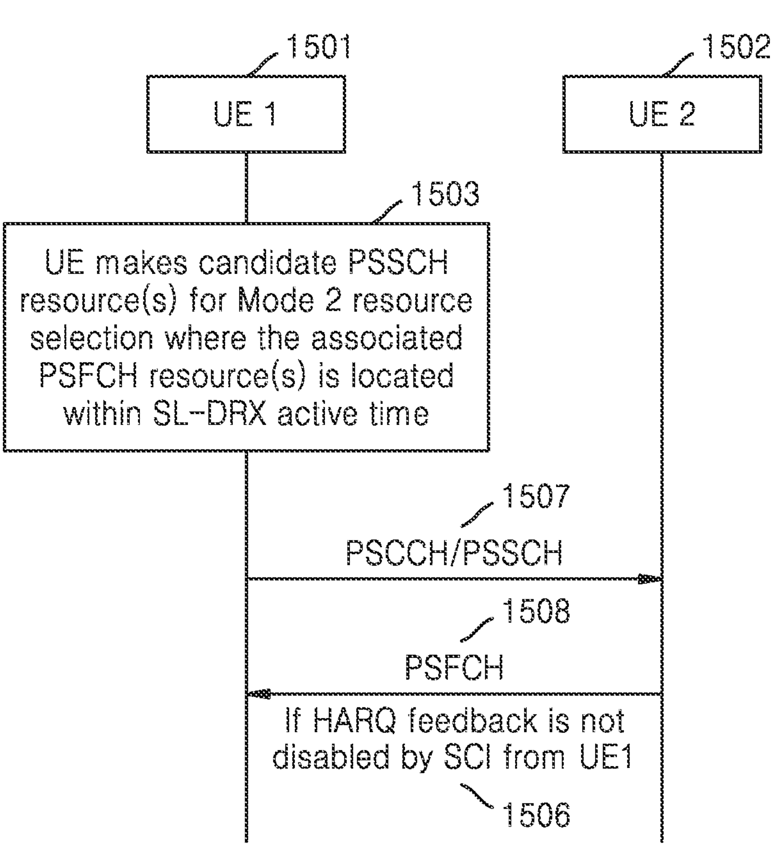
FIG. 15 illustrates a PSFCH handling operation in method 5, according to an embodiment of the disclosure.

FIG. 15 illustrates a PSFCH handling operation in method 5, according to an embodiment of the disclosure.

Referring to FIG. 15, when a resource for the PSFCH is configured in a resource pool for UE1 1501, a UE in the resource pool is able to receive the PSFCH and the UE performs sidelink DRX, UE1 1501 may leave out a resource for which a corresponding PSFCH resource is in the sidelink DRX active time from candidate resources for resource selection in a procedure for making the candidate resources for PSSCH transmission 1507. In operation 1503, the UE may obtain PSSCH resource candidates for which PSFCH reception is possible. Once the transmission resource candidates are obtained, the UE may select a PSSCH transmission resource through a mode 2 operation and UE1 1501 may transmit the PSSCH in operation 1507. Hence, when HARQ feedback for the corresponding PSSCH resource is not disabled in operation 1506, UE2 1502 may transmit the PSFCH in 1508 and UE1 1501 may receive the PSFCH.

Sixth Embodiment

The sixth embodiment provides a UE operation in which a resource for a PSFCH is configured in the resource pool, a UE in the resource pool is able to receive the PSFCH, and the UE handles the PSFCH when the UE performs sidelink DRX, in which case the TX UE may be defined as one unable to receive the PSFCH in the sidelink DRX inactive time and accordingly, the resource position of the PSFCH may be defined to be the first PSFCH resource belonging to a DRX active time section after a minimum time gap between the PSSCH and the PSFCH. This may correspond to method 6 among the proposed methods.

Figure 16:
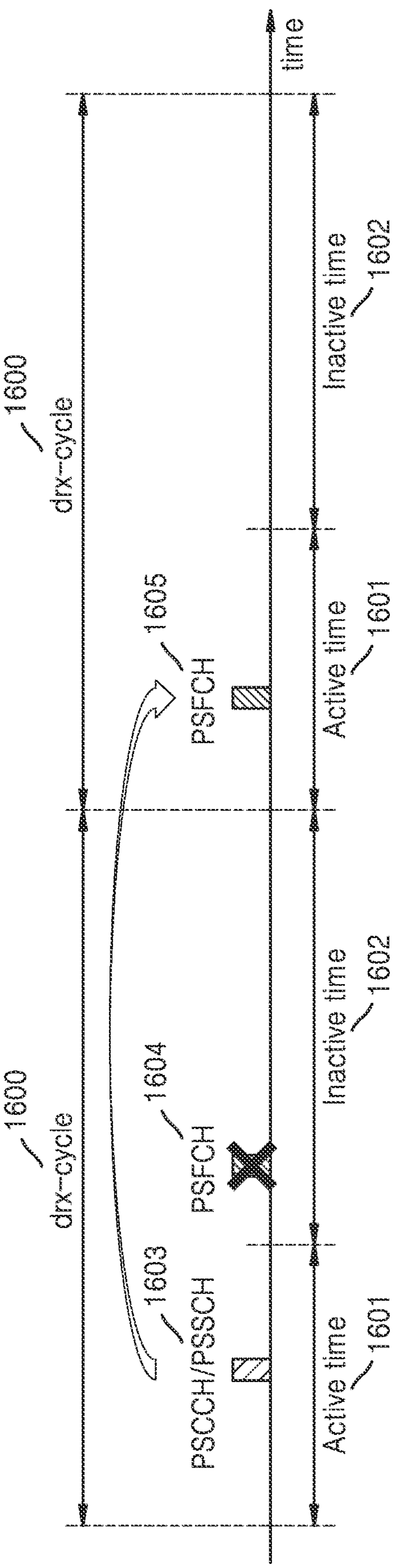
FIG. 16 illustrates a method by which a PSFCH resource position is defined to be a first PSFCH resource belonging to a DRX active time section after a PSSCH-PSFCH gap, according to an embodiment of the disclosure.

FIG. 16 illustrates a method by which a PSFCH resource position is defined to be a first PSFCH resource belonging to a DRX active time section after a PSSCH-PSFCH gap, according to an embodiment of the disclosure.

Referring to FIG. 16, shown is an occasion when the UE performs sidelink DRX, drx-cycle 1600 is set, and an active time 1601 and an inactive time 1602 are operated. In FIG. 16, when a PSSCH resource is selected in operation 1603, a corresponding PSFCH resource may be defined to be a first slot of the sidelink DRX active time that includes the PSFCH resource determined by the transmission interval N of the PSFCH resource after K slots from a slot where the PSSCH is transmitted. In this case, the value of K may be:

- a minimum time difference K between the PSSCH and the PSFCH, which may be configured in the resource pool, and the value of which may be a logical slot unit of K=2 or 3.

Furthermore, the value of N may be:

- a transmission interval N of the PSFCH resource, which may be configured in the resource pool, and the value of which may be a logical slot unit of N=0, 1, 2 or 4.

According to the proposed method, the position in which the PSFCH is transmitted in FIG. 16 may be determined to be 1605 instead of 1604.

Figure 17:
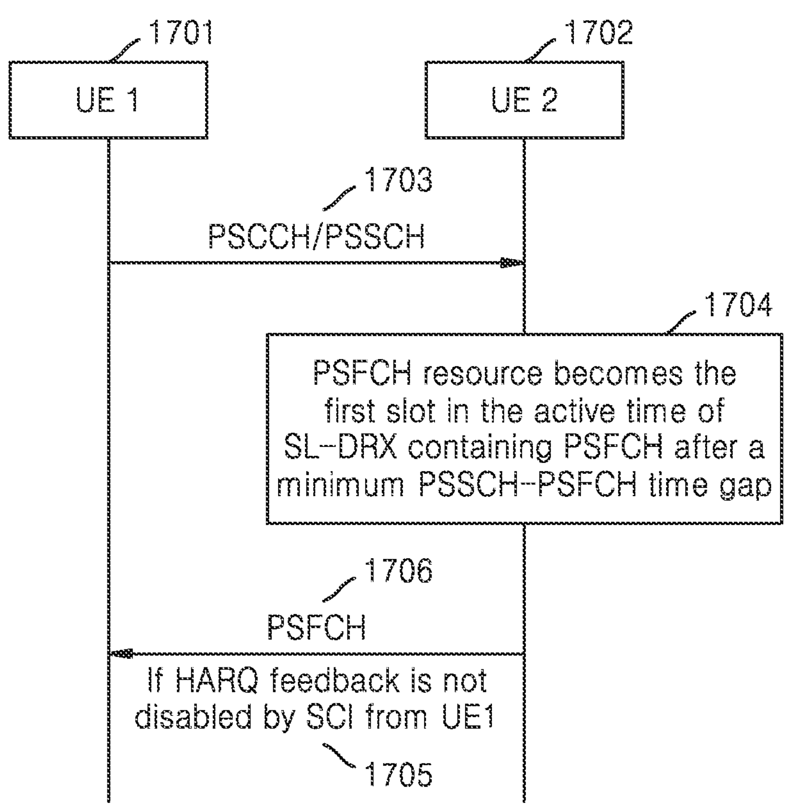
FIG. 17 illustrates a PSFCH handling operation in method 6, according to an embodiment of the disclosure.

FIG. 17 illustrates a PSFCH handling operation in method 6, according to an embodiment of the disclosure.

Referring to FIG. 17, in a case that a resource for a PSFCH is configured in the resource pool for UE1 1701, a UE in the resource pool is able to receive the PSFCH, and the UE performs sidelink DRX, when UE1 transmits a PSSCH in operation 1703, the position of a corresponding PSFCH resource may be defined to be a first PSFCH resource belonging to a DRX active time section after a minimum time gap between the PSSCH and the PSFCH in operation 1704. Hence, when HARQ feedback for the corresponding PSSCH resource is not disabled in operation 1705, UE2 1702 may transmit a PSFCH in operation 1706 and UE1 1701 may receive the PSFCH.

Seventh Embodiment

The seventh embodiment provides a method in which a resource for a PSFCH is configured in the resource pool, a UE in the resource pool is able to receive the PSFCH, and the UE handles the PSFCH when the UE performs sidelink DRX, and provides how the UE selects a method when one or more of method 1 to method 6 as proposed above are supported. Specifically, when one or more methods of handling a PSFCH are supported in a case of performing sidelink DRX, the following alternatives may be considered:

- alternative 1: determined by UE implementation.
  - alternative 1 is how to select a method of handling a PSFCH by UE implementation when one or more methods of handling the PSFCH are supported in a case of performing sidelink DRX.
- alternative 2: determined by a higher layer.
  - alternative 2 is how to select a method of handling a PSFCH by a higher layer when one or more methods of handling the PSFCH are supported in a case of performing sidelink DRX. This may refer to how to pre-configure which one of one or more methods is to be used in a system perspective. Alternatively, it may be a method where which one of the one or more methods is to be used is determined by a higher layer of the UE and indicated to the physical layer in a UE perspective. The latter case may also be interpreted as UE implementation.
- alternative 3: determined by a battery state of the UE.
  - alternative 3 is how to select a method of handling a PSFCH by a battery state of the UE when one or more methods of handling the PSFCH are supported in a case of performing sidelink DRX. For this, threshold X for the battery state may be defined. X=100 may mean that the battery is fully charged, and X=0 may mean that the battery is completely discharged. The threshold for the battery state may be set by an implementation, determined as a fixed value (e.g., X=50), or a value of which may be (pre-)configured. For example, in a case that two methods, method 1 and method 2 are both selected to handle the PSFCH in performing sidelink DRX, it may be considered to use method 2 when the battery is sufficiently charged and method 1 otherwise. Method 2 is to always receive the PSFCH and method 1 is to not always receive the PSFCH, so method 1 may be used to prevent power consumption when the battery of the UE is not sufficiently charged. Similarly, in a case that the battery state is lower than the threshold when consumption of power required to use one of the proposed methods is taken into account, it is determined that the battery is not sufficiently charged and thus, a method to minimize power consumption may be selected.
- alternative 4: determined by priority.
  - alternative 4 is how to select a method of handling a PSFCH by priority when one or more methods of handling the PSFCH are supported in a case of performing sidelink DRX. The priority may refer to one indicated by the UE in SCI. Threshold Y of the priority to select a method may be defined. The threshold of the priority may be set by an implementation, determined as a fixed value, or a value of which may be (pre-)configured. For example, in a case that two methods, method 1 and method 2 are both selected to handle the PSFCH in performing sidelink DRX, it may be considered to use method 2 when the UE has a high priority and method 1 otherwise. Method 2 is to always receive the PSFCH and method 1 is to not always receive the PSFCH, so method 2 may be used to improve transmission reliability through HARQ feedback when the UE has a high priority. Similarly, in a case that the priority is higher than the threshold when the priority is considered to use one of the proposed methods, a method to enable HARQ feedback may be selected to improve reliability.

Eighth Embodiment

The eighth embodiment provides a method of handling the PSFCH in performing sidelink DRX in an RX UE perspective. The first to seventh embodiments provide methods related to PSFCH reception when a TX UE performs sidelink DRX. However, in this embodiment, a case that an RX UE performs sidelink DRX and transmits the PSFCH is considered. In general, the sidelink DRX is an operation defined in terms of receiving operation. However, provided is a method to prevent the TX UE from receiving the PSFCH when the RX UE performs sidelink DRX by taking into account power consumption in transmitting the PSFCH.

In a case that a resource for the PSFCH is configured in the resource pool, a UE in the resource pool is able to receive the PSFCH and the UE performs sidelink DRX, a method by which the TX UE disables HARQ feedback when it is determined that a peer UE of the TX UE, i.e., the RX UE, performs sidelink DRX in the same manner. The disabling of the HARQ feedback may be indicated by the TX UE to the RX UE in SCI, especially by an HARQ feedback enable/disable indicator in the second SCI.

Figure 18:
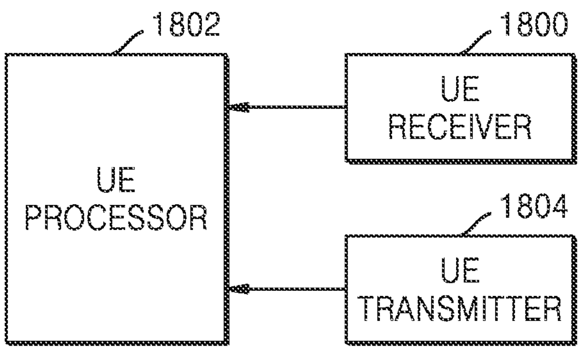
FIG. 18 is a block diagram illustrating an internal structure of a UE, according to an embodiment of the disclosure.
Figure 19:
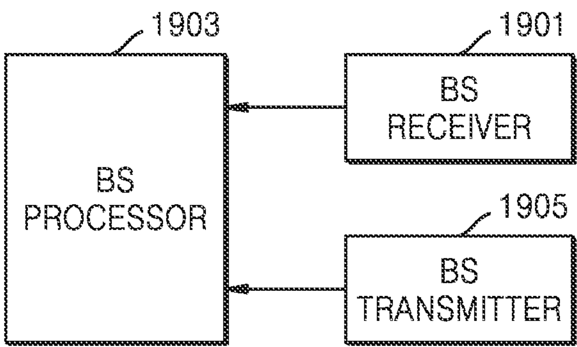
FIG. 19 is a block diagram illustrating an internal structure of a BS, according to an embodiment of the disclosure.

Transmitters, receivers, and processors of the UE and the BS to implement the embodiments of the disclosure are shown in FIGS. 18 and 19, respectively. In the embodiments of the disclosure, provided is a method by which the UE performs multi-antenna transmission and reception in sidelink, and to perform this, the receivers, the processors and the transceivers of the BS and UE each need to operate according to the embodiments.

FIG. 18 is a block diagram illustrating an internal structure of a UE, according to an embodiment of the disclosure.

Referring to FIG. 18, the UE of the disclosure may include a UE receiver 1800, a UE transmitter 1804, and a UE processor 1802. The UE receiver 1800 and the UE transmitter 1804 may be collectively referred to as a transceiver in the embodiments of the disclosure. The transceiver may transmit or receive signals to or from a BS. In an embodiment, the signal may include control information and data. For this, the transceiver may include an RF transmitter for up-converting the frequency of a signal to be transmitted and amplifying the signal and an RF receiver for low-noise amplifying a received signal and down-converting the frequency of the received signal. In addition, the transceiver may receive a signal on a wireless channel and output the signal to the UE processor 1802, or transmit a signal output from the UE processor 1802 on a wireless channel. The UE processor 1802 may control a series of processes for the UE to operate according to the embodiments of the disclosure.

FIG. 19 is a block diagram illustrating an internal structure of a BS, according to an embodiment of the disclosure.

Referring to FIG. 19, the BS of the disclosure may include a BS receiver 1901, a BS transmitter 1905, and a BS processor 1903. The receiver 1901 and the transmitter 1905 may be collectively referred to as a transceiver in the embodiments of the disclosure. The transceiver may transmit or receive signals to or from a UE. The signals may include control information and data. For this, the transceiver may include an RF transmitter for up-converting the frequency of a signal to be transmitted and amplifying the signal and an RF receiver for low-noise amplifying a received signal and down-converting the frequency of the received signal. In addition, the transceiver may receive a signal on a wireless channel and output the signal to the BS processor 1903, or transmit a signal output from the UE processor 1903 on a wireless channel. The BS processor 1903 may control a series of processes for the BS to operate according to the embodiments of the disclosure.

Embodiments of the disclosure as described in the specification and drawings are merely provided specifically to easily explain the technologies of the disclosure and help understand the disclosure, and are not intended to limit the scope of the disclosure. Thus, it will be apparent to those of ordinary skill in the art that modifications to the embodiments of the disclosure based on the technical idea of the disclosure are also feasible. Furthermore, the embodiments may be operated by being combined with one another if necessary. For example, all the embodiments of the disclosure may be combined to operate the BS and the UE. Specifically, the first to sixth embodiments may be partially combined and operated.

In the embodiments of the disclosure, a component included in the disclosure is expressed in a singular or plural form according to the embodiments. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have thus been described, but it will be understood that various modifications can be made without departing the scope of the disclosure. Thus, it will be apparent to those ordinary skilled in the art that the disclosure is not limited to the embodiments described, but can encompass not only the appended claims but the equivalents.

Methods according to the claims of the disclosure or the embodiments of the disclosure described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have thus been described, but it will be understood that various modifications can be made without departing the scope of the disclosure. Thus, it will be apparent to those ordinary skilled in the art that the disclosure is not limited to the embodiments described, but can encompass not only the appended claims but the equivalents. Thus, it will be apparent to those ordinary skilled in the art that the disclosure is not limited to the embodiments of the disclosure described, which have been provided only for illustrative purposes. Furthermore, the embodiments may be operated by being combined with one another if necessary. For example, parts of the methods proposed in the disclosure may be combined to operate the BS and the UE. Although the embodiments of the disclosure are proposed based on 5G or NR systems, modifications to the embodiments of the disclosure, which do not deviate from the scope of the disclosure, may be applicable to other systems such as an LTE system, an LTE-A system, an LTE-A-Pro system, etc.

The invention claimed is:

1. A first user equipment (UE) for performing sidelink communication in a wireless communication system, the first UE comprising:

a transceiver; and at least one processor coupled with the transceiver, wherein the at least one processor is configured to:

obtain, through higher layer signaling, information regarding a method of handling a physical sidelink feedback channel (PSFCH) while performing a discontinuous reception (DRX), transmit, to a second UE, a physical sidelink shared channel (PSSCH), based on determination to receive or not receive the PSFCH according to the obtained information regarding the method of handling the PSFCH while performing the DRX, transmit, to the second UE, sidelink control information (SCI) including information requesting to transmit a PSFCH for the PSSCH, and receive, from the second UE, the PSFCH for the PSSCH during a DRX active time if a slot for receiving the PSFCH determined based on PSFCH resource configuration information is in the DRX active time.

2. The first UE of claim 1, wherein the slot for receiving the PSFCH is defined always as the DRX active time.

3. The first UE of claim 1, wherein the at least one processor is configured to transmit, to the second UE, SCI including information requesting not to transmit the PSFCH for the PSSCH when the PSFCH is in a DRX inactive time.

4. The first UE of claim 1, wherein the at least one processor is configured to:

receive, from the second UE, the PSFCH for the PSSCH in the slot for receiving the PSFCH in a DRX inactive time when the slot for receiving the PSFCH for the PSSCH is in the DRX inactive time; and receive no information other than the PSFCH in the slot for receiving the PSFCH present in the DRX inactive time.

5. The first UE of claim 1, wherein a resource for the PSSCH is selected so that reception of the PSFCH corresponding to the PSSCH is in the DRX active time.

6. The first UE of claim 1, wherein the at least one processor is configured to:

determine candidate resources of PSSCHs each having a corresponding PSFCH which is in the DRX active time among a plurality of PSSCHs; and transmit the PSSCH among the candidate resources of the PSSCHs.

7. The first UE of claim 1, wherein the at least one processor is configured to receive the PSFCH for the PSSCH in a first PSFCH slot belonging to the DRX active time among slots after a minimum time gap between the PSSCH and the PSFCH from a slot for the PSSCH, when there is the slot for receiving the PSFCH in the DRX inactive time.

8. A second user equipment (UE) for performing sidelink communication in a wireless communication system, the second UE comprising:

a transceiver; and at least one processor coupled with the transceiver, wherein the at least one processor is configured to:

receive, from a first UE, a physical sidelink shared channel (PSSCH), based on determination of the first UE to receive or not receive a physical sidelink feedback channel (PSFCH) according to information regarding a method of handling the PSFCH while a discontinuous reception (DRX), receive, from the first UE, sidelink control information (SCI) including information requesting to transmit a PSFCH for the PSSCH, and based on the SCI, transmit, to the first UE, the PSFCH for the PSSCH if a slot for the PSFCH determined based on PSFCH resource configuration information is in a DRX active time of the first UE, wherein the information regarding the method of handling the PSFCH while the DRX is obtained at the first UE through higher layer signaling.

9. The second UE of claim 8, wherein the slot for receiving the PSFCH is defined always as the DRX active time of the first UE.

10. The second UE of claim 8, wherein the at least one processor is configured to receive, from the first UE, SCI including information requesting not to transmit the PSFCH for the PSSCH when the PSFCH is in a DRX inactive time of the first UE.

11. The second UE of claim 8, wherein the at least one processor is configured to:

transmit, to the first UE, the PSFCH for the PSSCH in the slot for the PSFCH in a DRX inactive time when the slot for the PSFCH for the PSSCH is in the DRX inactive time of the first UE; and transmit no information other than the PSFCH in the slot for the PSFCH present in the DRX inactive time.

12. The second UE of claim 8, wherein the at least one processor is configured to transmit the PSFCH for the PSSCH in a first PSFCH slot belonging to the DRX active time of the first UE among slots after a minimum time gap between the PSSCH and the PSFCH from a slot for the PSSCH, when there is the slot for the PSFCH in the DRX inactive time of the first UE.

13. An operation method of a first user equipment (UE) for performing sidelink communication in a wireless communication system, the operation method comprising:

obtaining, through higher layer signaling, information regarding a method of handling a physical sidelink feedback channel (PSFCH) while performing a discontinuous reception (DRX);

transmitting, to a second UE, a physical sidelink shared channel (PSSCH);

based on determination to receive or not receive the PSFCH according to the obtained information regarding the method of handling the PSFCH while performing the DRX, transmitting, to the second UE, sidelink control information (SCI) including information requesting to transmit a PSFCH for the PSSCH; and receiving, from the second UE, the PSFCH for the PSSCH during a DRX active time if a slot for receiving the PSFCH determined based on PSFCH resource configuration information is in the DRX active time.

14. An operation method of a second user equipment (UE) for performing sidelink communication in a wireless communication system, the operation method comprising:

receiving, from a first UE, a physical sidelink shared channel (PSSCH), based on determination of the first UE to receive or not receive a physical sidelink feedback channel (PSFCH) according to information regarding a method of handling the PSFCH while a discontinuous reception (DRX), receiving, from the first UE, sidelink control information (SCI) including information requesting to transmit a PSFCH for the PSSCH; and based on the SCI, transmitting, to the first UE, the PSFCH for the PSSCH if a slot for the PSFCH determined based on PSFCH resource configuration information is in a DRX active time of the first UE, wherein the information regarding the method of handling the PSFCH while the DRX is obtained at the first UE through higher layer signaling.

* * * * *